US012277381B2

(12) United States Patent
Williams et al.

(10) Patent No.: US 12,277,381 B2
(45) Date of Patent: Apr. 15, 2025

(54) INTELLIGENT INSET WINDOW PLACEMENT IN CONTENT

(71) Applicant: Apple Inc., Cupertino, CA (US)

(72) Inventors: Adam P Williams, Pittsburgh, PA (US); David A Underwood, Vancouver (CA); Amy W Hung, San Francisco, CA (US)

(73) Assignee: Apple Inc., Cupertino, CA (US)

( * ) Notice: Subject to any disclaimer, the term of this patent is extended or adjusted under 35 U.S.C. 154(b) by 0 days.

(21) Appl. No.: 18/612,689

(22) Filed: Mar. 21, 2024

(65) Prior Publication Data
US 2024/0232504 A1 Jul. 11, 2024

Related U.S. Application Data

(63) Continuation of application No. 17/682,885, filed on Feb. 28, 2022, now Pat. No. 11,941,341.

(51) Int. Cl.
G06F 17/00 (2019.01)
G06F 40/106 (2020.01)
G06V 10/22 (2022.01)
G06V 10/764 (2022.01)

(52) U.S. Cl.
CPC ............ G06F 40/106 (2020.01); G06V 10/22 (2022.01); G06V 10/764 (2022.01)

(58) Field of Classification Search
CPC ...... G06F 40/106; G06F 3/0481; G06F 9/451; G06V 10/22; G06V 10/764
See application file for complete search history.

(56) References Cited

U.S. PATENT DOCUMENTS

| | | | |
|---|---|---|---|
| 9,026,938 B2 * | 5/2015 | Carlisle | G06F 3/0482 |
| | | | 715/810 |
| 9,285,883 B2 | 3/2016 | Bi et al. | |
| 9,383,901 B1 | 7/2016 | Dikhit | |
| 9,886,163 B2 | 2/2018 | Lira | |
| 9,998,784 B2 | 6/2018 | Yu et al. | |
| 10,097,785 B2 | 10/2018 | Shintani et al. | |
| 10,515,561 B1 * | 12/2019 | Fieldman | G09B 7/00 |
| 10,684,743 B2 | 6/2020 | Pennington et al. | |
| 11,481,933 B1 | 10/2022 | Etwaru et al. | |
| 11,727,695 B2 | 8/2023 | Jones et al. | |
| 2012/0324502 A1 | 12/2012 | Amsterdam et al. | |
| 2013/0031481 A1 | 1/2013 | Schreifels | |
| 2013/0216206 A1 * | 8/2013 | Dubin | G11B 27/031 |
| | | | 386/282 |
| 2013/0239028 A1 | 9/2013 | Forutanpour et al. | |
| 2014/0359656 A1 | 12/2014 | Banica et al. | |
| 2015/0309565 A1 | 10/2015 | Beri et al. | |

(Continued)

OTHER PUBLICATIONS

Extended European Search Report for EPO Application No. 23155950.1 dated Jul. 14, 2023; 9 pgs.

Primary Examiner — Laurie A Ries
(74) Attorney, Agent, or Firm — FLETCHER YODER PC

(57) ABSTRACT

Disclosed herein are techniques for providing live video feed content within primary content of a slide presentation application. An inset window may provide an indication of size, shape, location, etc. of the live video feed when presented with the primary content. The inset window/live video feed may be applied across all slides of the slide presentation via a request provided via graphical user interface of the slide presentation application.

20 Claims, 17 Drawing Sheets

(56) References Cited

U.S. PATENT DOCUMENTS

| | | |
|---|---|---|
| 2016/0125778 A1 | 5/2016 | Antipa et al. |
| 2017/0046590 A1 | 2/2017 | Alpert |
| 2017/0286368 A1 | 10/2017 | Osindero et al. |
| 2018/0088769 A1* | 3/2018 | Yamat .................. G06F 40/106 |
| 2018/0181593 A1 | 6/2018 | Ranzinger et al. |
| 2018/0284954 A1 | 10/2018 | Alcorn et al. |
| 2019/0361694 A1* | 11/2019 | Gordon .................. G06F 9/452 |
| 2020/0159838 A1 | 5/2020 | Kikin-Gil et al. |
| 2020/0241744 A1 | 7/2020 | Findlay et al. |
| 2021/0027508 A1 | 1/2021 | Sharma et al. |
| 2022/0084237 A1 | 3/2022 | Li et al. |

\* cited by examiner

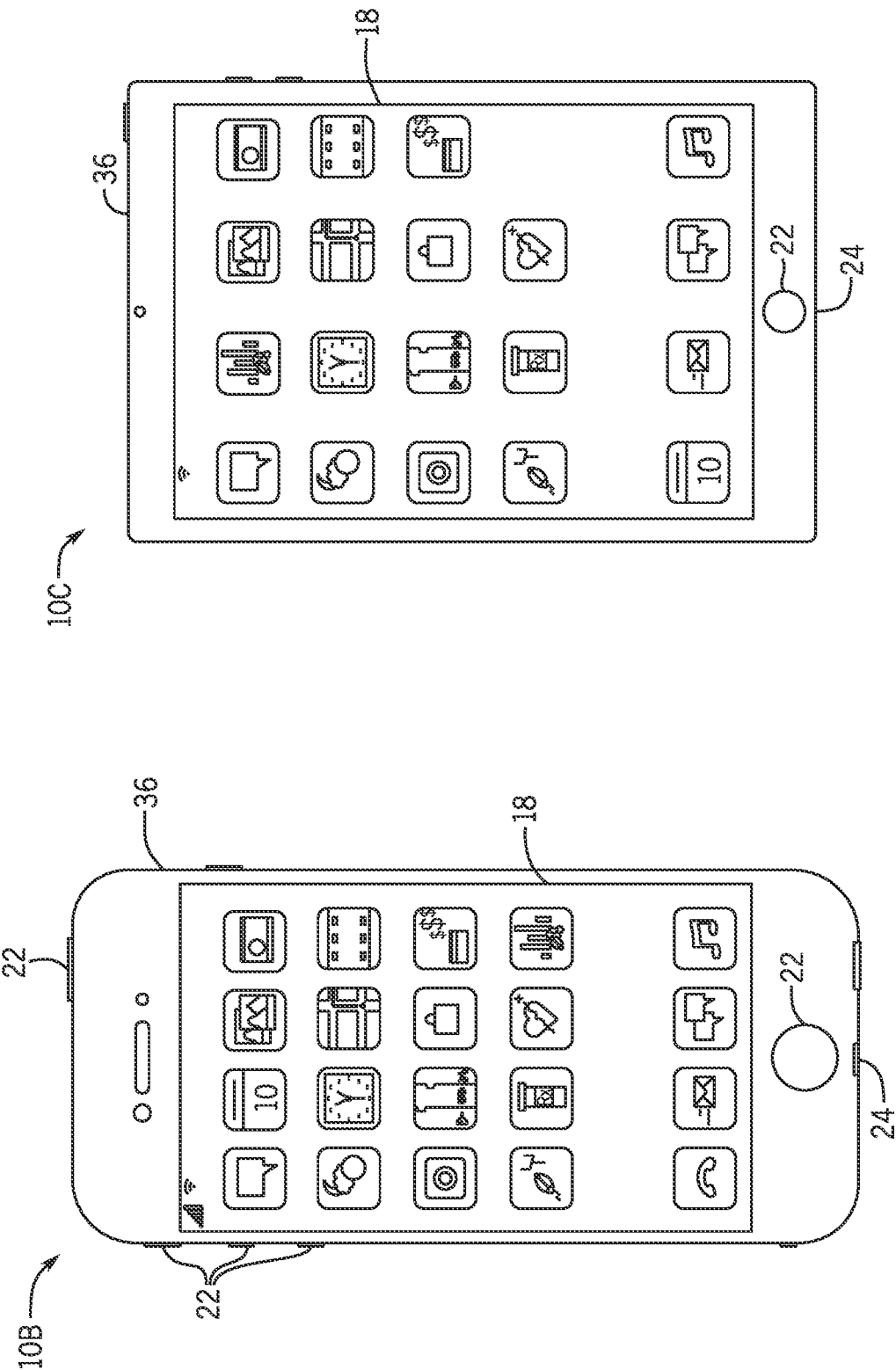

INTELLIGENT INSET WINDOW PLACEMENT IN CONTENT

CROSS REFERENCE TO RELATED APPLICATIONS

This application is a continuation of U.S. application Ser. No. 17/682,885, entitled "Intelligent Inset Window Placement in Content," filed Feb. 28, 2022 which is incorporated herein by reference in its entirety for all purposes.

BACKGROUND

The present disclosure relates generally to providing inset windows in content and, more specifically, to adjusting inset window placement to avoid salient regions of the content.

This section is intended to introduce the reader to various aspects of art that may be related to various aspects of the present disclosure, which are described and/or claimed below. This discussion is believed to be helpful in providing the reader with background information to facilitate a better understanding of the various aspects of the present disclosure. Accordingly, it should be understood that these statements are to be read in this light, and not as admissions of prior art.

An electronic device, such as a laptop, tablet, or cell phone, may include software that, when executed, provides digital content. From time to time, it may be useful to provide supplemental content. Such supplemental content may be provided in an inset window. Unfortunately, however, provision of supplemental content in an inset window oftentimes requires significant manual manipulation to find an ideal placement of the inset window. Accordingly, new techniques to automatically create an ideal presentation via an inset window are provided herein.

SUMMARY

A summary of certain embodiments disclosed herein is set forth below. It should be understood that these aspects are presented merely to provide the reader with a brief summary of these certain embodiments and that these aspects are not intended to limit the scope of this disclosure. Indeed, this disclosure may encompass a variety of aspects that may not be set forth below.

Electronic devices increasingly provide digital content for presentation to a user. During playback of the digital content, it may be desirable to provide supplemental content (e.g., additional content, which may be associated with the digital content) in parallel with the digital content. Unfortunately, the supplemental content may sometimes detract from and/or provide conflicting output with the primary content (e.g., by overlapping a salient region of the primary content, causing the primary content to be displayed in a smaller size to allow for presentation of the supplemental content, etc.). Accordingly, new systems and techniques useful for adaptively providing supplemental content, via an adaptive inset window, are discussed herein.

BRIEF DESCRIPTION OF THE DRAWINGS

Various aspects of this disclosure may be better understood upon reading the following detailed description and upon reference to the drawings in which:

FIG. 3 is a front view of a hand-held device employing adaptive inset windows as described herein, in accordance with an embodiment of the present disclosure;

FIG. 4 is a front view of portable tablet computer employing adaptive inset windows as described herein, in accordance with an embodiment of the present disclosure;

DETAILED DESCRIPTION OF SPECIFIC EMBODIMENTS

One or more specific embodiments will be described below. In an effort to provide a concise description of these embodiments, not all features of an actual implementation are described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

As mentioned above, electronic devices increasingly provide digital content for presentation to a user. During playback of the digital content, it may be desirable to provide supplemental content (e.g., additional content, which may be associated with the digital content) in parallel with the digital content. Unfortunately, the supplemental content may sometimes detract from and/or provide conflicting output with the primary content (e.g., by overlapping a salient region of the primary content, causing the primary content to be displayed in a smaller size to allow for presentation of the supplemental content, etc.). Accordingly, new systems and techniques useful for adaptively providing supplemental content, via an adaptive inset window, are discussed herein.

As further discussed below, adaptive inset windows may be used to provide supplemental content within a provision of primary content. Specifically, salient regions of objects within the primary content may be identified and used to identify non-salient regions within the primary content. Adaptive inset windows may be provided to present the supplemental content. These adaptive inset windows may be adapted to turn on or off (e.g., via modification of an activation status), change size, change shape, change position, change supplemental content, etc. based upon the non-salient regions of the primary content and/or other current characteristics of the primary content, such as a contextual position, an underlying template of the current primary content, etc.

Figure 1:
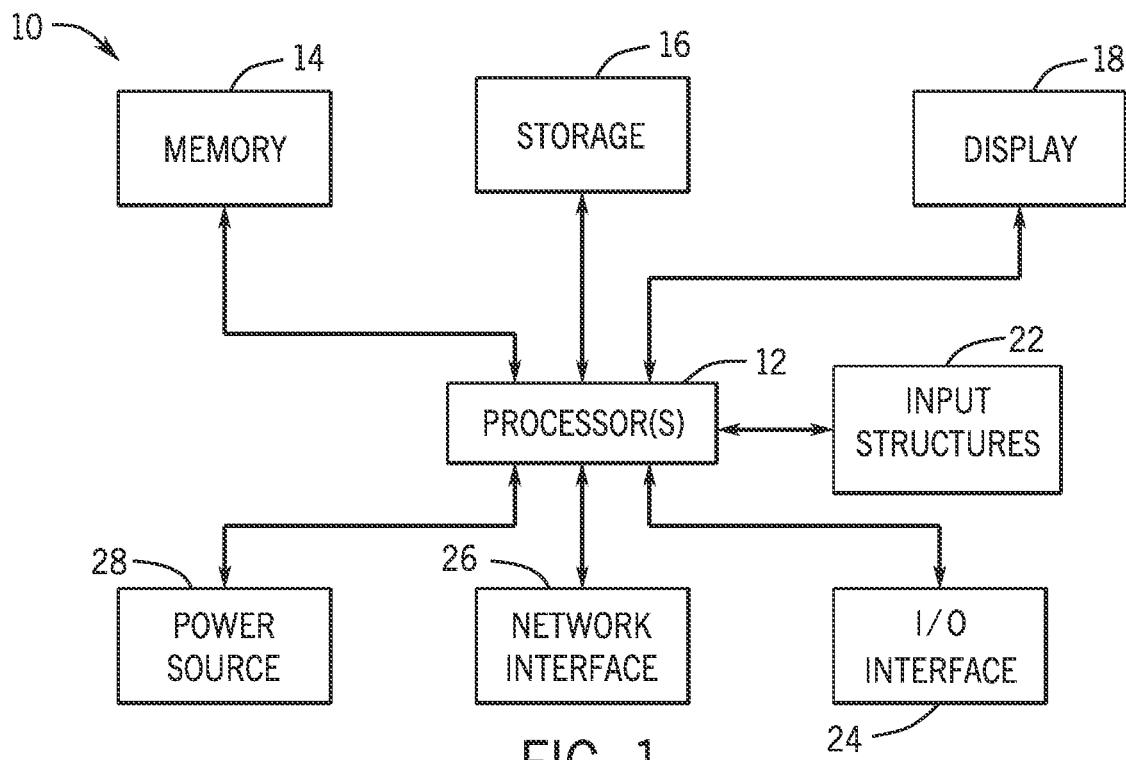
FIG. 1 is a block diagram of an electrical device that may employ adaptive inset windows during presentation of content, in accordance with an embodiment of the present disclosure.

With the foregoing in mind, a general description of suitable electronic devices that may employ adaptive inset windows will be provided below. Turning first to FIG. 1, an electronic device 10 according to an embodiment of the present disclosure may include, among other things, one or more processor(s) 12, memory 14, nonvolatile storage 16, a display 18, input structures 22, an input/output (I/O) interface 24, a network interface 26, and a power source 28. The various functional blocks shown in FIG. 1 may include hardware elements (including circuitry), software elements (including computer code stored on a computer-readable medium) or a combination of both hardware and software elements. It should be noted that FIG. 1 is merely one example of a particular implementation and is intended to illustrate the types of components that may be present in electronic device 10.

Figure 2:
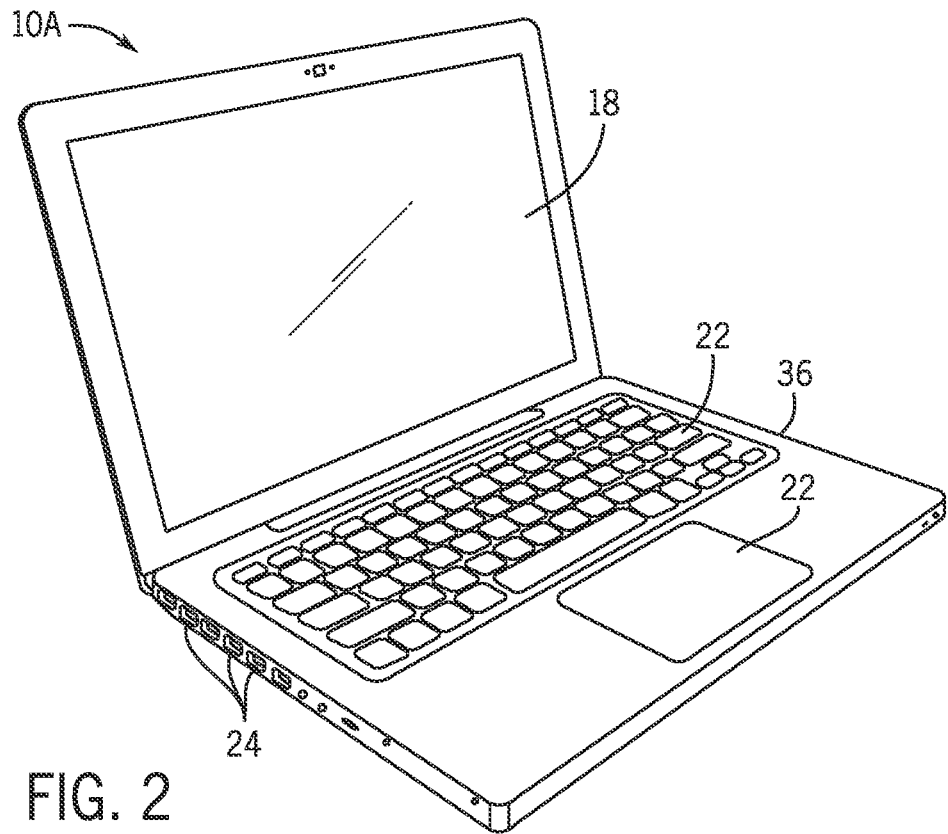
FIG. 2 is a perspective view of a notebook computer employing adaptive inset windows as described herein, in accordance with an embodiment of the present disclosure.
Figure 5:
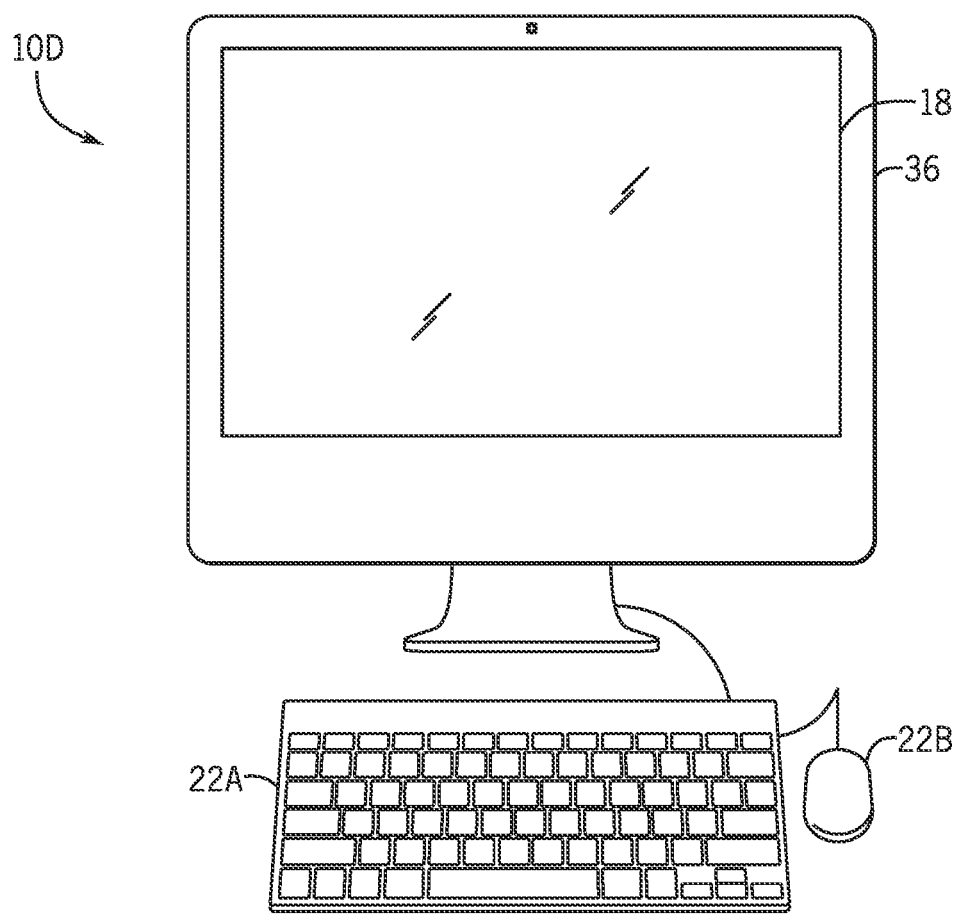
FIG. 5 is a front view of a desktop computer employing adaptive inset windows as described herein, in accordance with an embodiment of the present disclosure.
Figure 6:
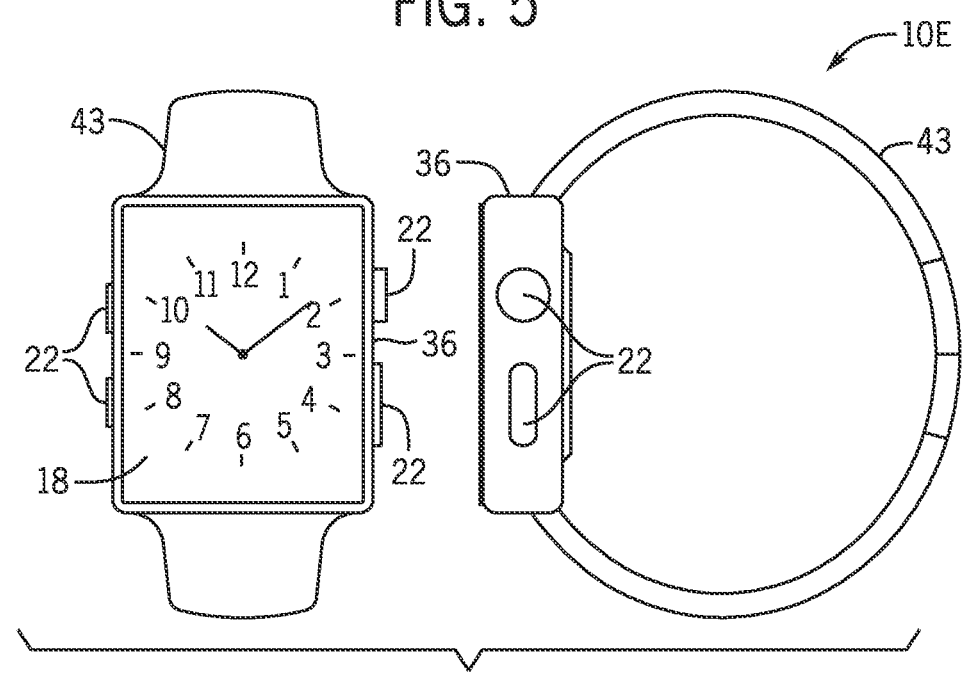
FIG. 6 is a front and side view of a wearable electrical device employing adaptive inset windows as described herein, in accordance with an embodiment of the present disclosure.

By way of example, the electronic device 10 may represent a block diagram of the notebook computer depicted in FIG. 2, the handheld device depicted in FIG. 3, the handheld device depicted in FIG. 4, the desktop computer depicted in FIG. 5, the wearable electronic device depicted in FIG. 6, or similar devices. It should be noted that the processor(s) 12 and other related items in FIG. 1 may be generally referred to herein as "data processing circuitry." Such data processing circuitry may be embodied wholly or in part as software, firmware, hardware, or any combination thereof. Furthermore, the data processing circuitry may be a single contained processing module or may be incorporated wholly or partially within any of the other elements within the electronic device 10.

In the electronic device 10 of FIG. 1, the processor(s) 12 may be operably coupled with the memory 14 and the nonvolatile storage 16 to perform various algorithms. Such programs or instructions executed by the processor(s) 12 may be stored in any suitable article of manufacture that includes one or more tangible, computer-readable media at least collectively storing the instructions or routines, such as the memory 14 and the nonvolatile storage 16. The memory 14 and the nonvolatile storage 16 may include any suitable articles of manufacture for storing data and executable instructions, such as random-access memory, read-only memory, rewritable flash memory, hard drives, and optical discs. In addition, programs (e.g., an operating system) encoded on such a computer program product may also include instructions that may be executed by the processor(s) 12 to enable the electronic device 10 to provide various functionalities.

In certain embodiments, the display 18 may be a liquid crystal display (LCD), which may allow users to view images generated on the electronic device 10. In some embodiments, the display 18 may include a touch screen, which may allow users to interact with a user interface of the electronic device 10. Furthermore, it should be appreciated that, in some embodiments, the display 18 may include one or more organic light emitting diode (OLED) displays, or some combination of LCD panels and OLED panels.

The input structures 22 of the electronic device 10 may enable a user to interact with the electronic device 10 (e.g., pressing a button to increase or decrease a volume level). The I/O interface 24 may enable electronic device 10 to interface with various other electronic devices, as may the network interface 26. The network interface 26 may include, for example, one or more interfaces for a personal area network (PAN), such as a Bluetooth network, for a local area network (LAN) or wireless local area network (WLAN), such as an 802.11x Wi-Fi network, and/or for a wide area network (WAN), such as a 3rd generation (3G) cellular network, 4th generation (4G) cellular network, long term evolution (LTE) cellular network, or long-term evolution license assisted access (LTE-LAA) cellular network. The network interface 26 may also include one or more interfaces for, for example, broadband fixed wireless access networks (WiMAX), mobile broadband Wireless networks (mobile WiMAX), asynchronous digital subscriber lines (e.g., ADSL, VDSL), digital video broadcasting-terrestrial (DVB-T) and its extension DVB Handheld (DVB-H), ultra- Wideband (UWB), alternating current (AC) power lines, and so forth. Network interfaces 26 such as the one described above may benefit from the use of tuning circuitry, impedance matching circuitry and/or noise filtering circuits that may include polymer capacitors such as the ones described herein. As further illustrated, the electronic device 10 may include a power source 28. The power source 28 may include any suitable source of power, such as a rechargeable lithium polymer (Li-poly) battery and/or an alternating current (AC) power converter.

In certain embodiments, the electronic device 10 may take the form of a computer, a portable electronic device, a wearable electronic device, or other type of electronic device. Such computers may include computers that are generally portable (such as laptop, notebook, and tablet computers) as well as computers that are generally used in one place (such as conventional desktop computers, workstations, and/or servers). In certain embodiments, the electronic device 10 in the form of a computer may be a model of a MacBook®, MacBook® Pro, MacBook Air®, iMac®, Mac® mini, or Mac Pro® available from Apple Inc. By way of example, the electronic device 10, taking the form of a notebook computer 10A, is illustrated in FIG. 2 in accordance with one embodiment of the present disclosure. The depicted notebook computer 10A may include a housing or enclosure 36, a display 18, input structures 22, and ports of an I/O interface 24. In one embodiment, the input structures 22 (such as a keyboard and/or touchpad) may be used to interact with the notebook computer 10A, such as to start, control, or operate a GUI or applications running on the notebook computer 10A. For example, a keyboard and/or touchpad may allow a user to navigate a user interface or application interface displayed on display 18.

FIG. 3 depicts a front view of a handheld device 10B, which represents one embodiment of the electronic device 10. The handheld device 10B may represent, for example, a portable phone, a media player, a personal data organizer, a handheld game platform, or any combination of such devices. By way of example, the handheld device 10B may be a model of an iPod® or iPhone® available from Apple Inc. of Cupertino, California. The handheld device 10B may include an enclosure 36 to protect interior components from physical damage and to shield them from electromagnetic interference. The enclosure 36 may surround the display 18. The I/O interfaces 24 may open through the enclosure 36 and may include, for example, an I/O port for a hard-wired connection for charging and/or content manipulation using a standard connector and protocol, such as the Lightning connector provided by Apple Inc., a universal serial bus (USB), or other similar connector and protocol.

Input structures 22, in combination with the display 18, may allow a user to control the handheld device 10B. For example, the input structures 22 may activate or deactivate the handheld device 10B, navigate user interface to a home screen, a user-configurable application screen, and/or activate a voice-recognition feature of the handheld device 10B. Other input structures 22 may provide volume control, or may toggle between vibrate and ring modes. The input structures 22 may also include a microphone may obtain a user's voice for various voice-related features, and a speaker may enable audio playback and/or certain phone capabilities. The input structures 22 may also include a headphone input may provide a connection to external speakers and/or headphones.

FIG. 4 depicts a front view of another handheld device 10C, which represents another embodiment of the electronic device 10. The handheld device 10C may represent, for example, a tablet computer, or one of various portable computing devices. By way of example, the handheld device 10C may be a tablet-sized embodiment of the electronic device 10, which may be, for example, a model of an iPad® available from Apple Inc. of Cupertino, California.

Turning to FIG. 5, a computer 10D may represent another embodiment of the electronic device 10 of FIG. 1. The computer 10D may be any computer, such as a desktop computer, a server, or a notebook computer, but may also be a standalone media player or video gaming machine. By way of example, the computer 10D may be an iMac®, a MacBook®, or another similar device by Apple Inc. It should be noted that the computer 10D may also represent a personal computer (PC) by another manufacturer. A similar enclosure 36 may be provided to protect and enclose internal components of the computer 10D such as the display 18. In certain embodiments, a user of the computer 10D may interact with the computer 10D using various peripheral input devices, such as the keyboard 22A or mouse 22B (e.g., input structures 22), which may connect to the computer 10D.

Similarly, FIG. 6 depicts a wearable electronic device 10E representing another embodiment of the electronic device 10 of FIG. 1 that may be configured to operate using the techniques described herein. By way of example, the wearable electronic device 10E, which may include a wristband 43, may be an Apple Watch® by Apple, Inc. However, in other embodiments, the wearable electronic device 10E may include any wearable electronic device such as, for example, a wearable exercise monitoring device (e.g., pedometer, accelerometer, heart rate monitor), or other device by another manufacturer. The display 18 of the wearable electronic device 10E may include a display 18 (e.g., touchscreen, LCD, OLED display, active-matrix organic light emitting diode (AMOLED) display, and so forth), as well as input structures 22, which may allow users to interact with a user interface of the wearable electronic device 10E.

Figure 7:
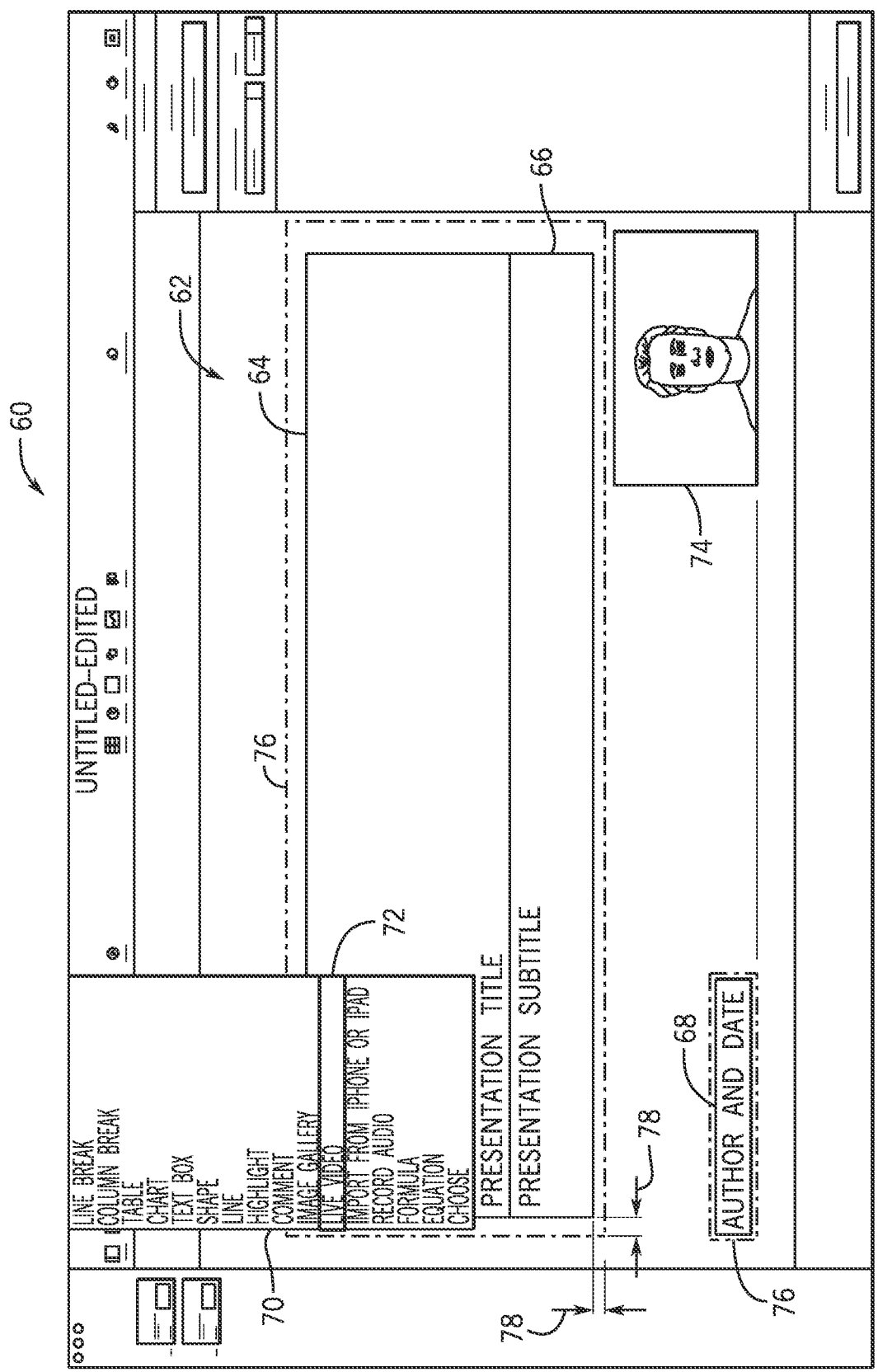
FIG. 7 is a schematic view of graphical user interface (GUI) where adaptive inset window provision is requested, in accordance with an embodiment of the present disclosure.
Figure 8:
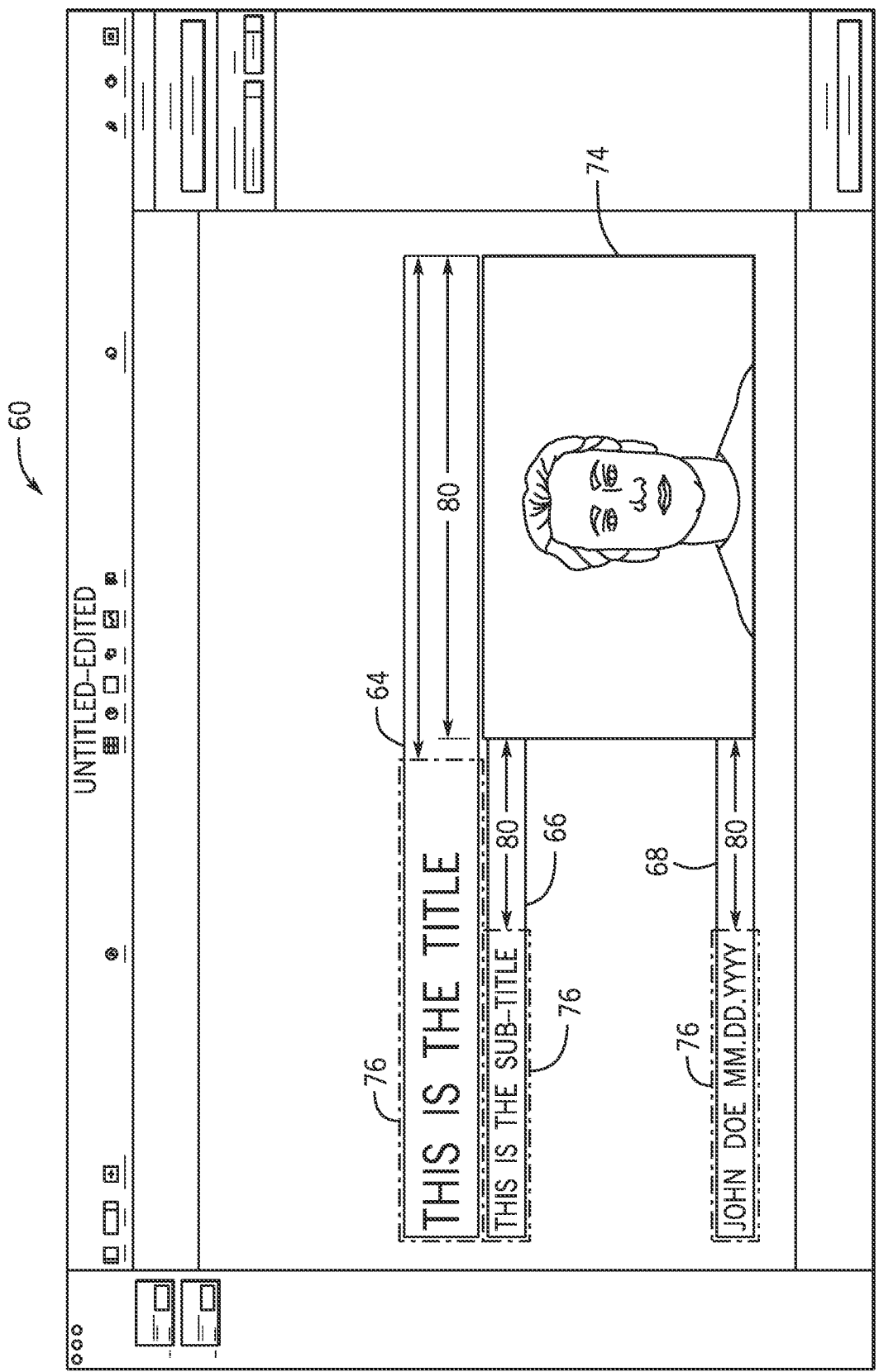
FIG. 8 is a schematic view of the GUI of FIG. 7 where an adaptive inset window adapts to salient regions defined by edits to objects of content, in accordance with an embodiment of the present disclosure.
Figure 9:
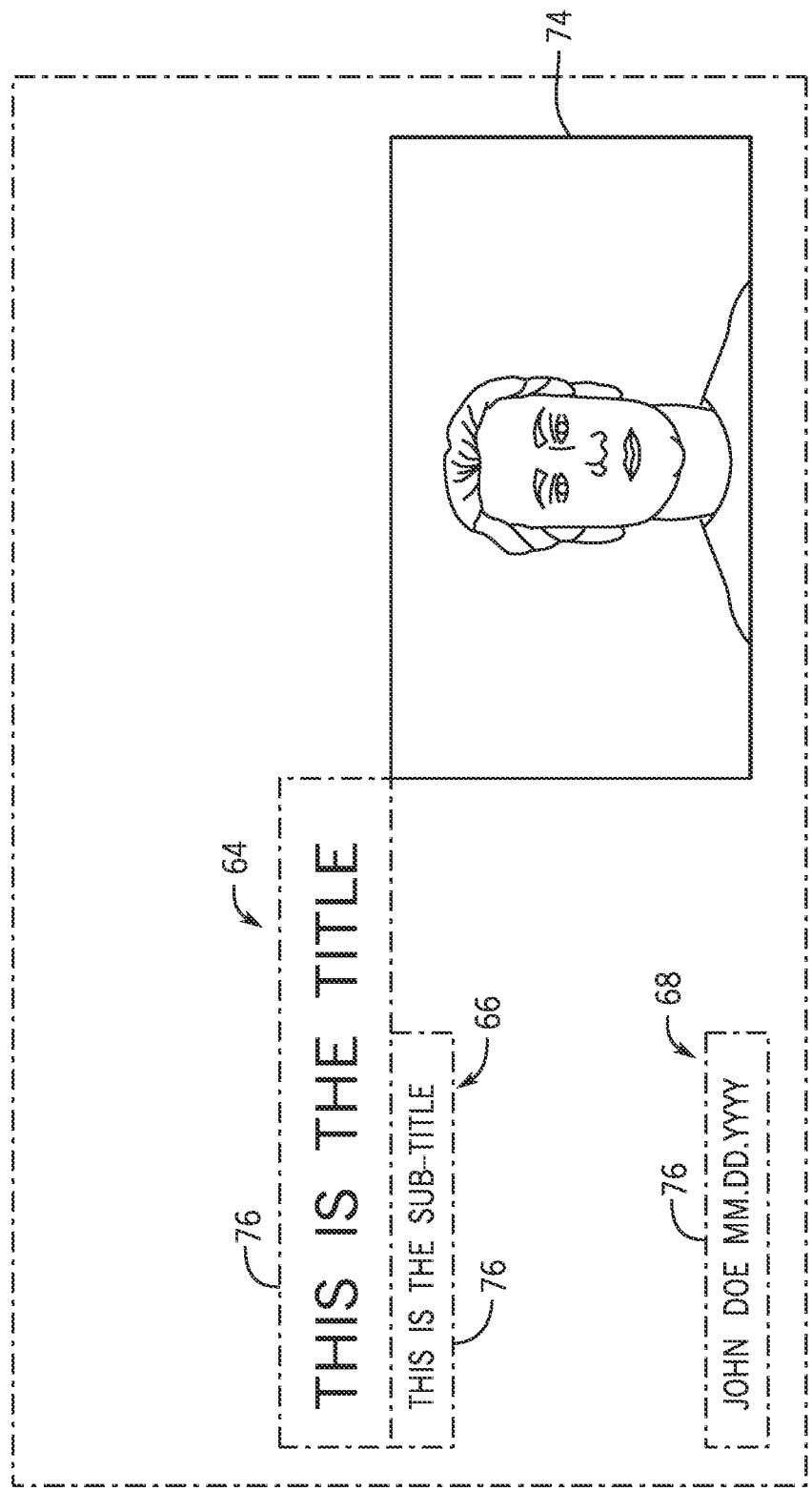
FIG. 9 is a schematic view of a presentation mode GUI rendered from the edits to the content described in FIG. 8, in accordance with an embodiment of the present disclosure.
Figure 10:
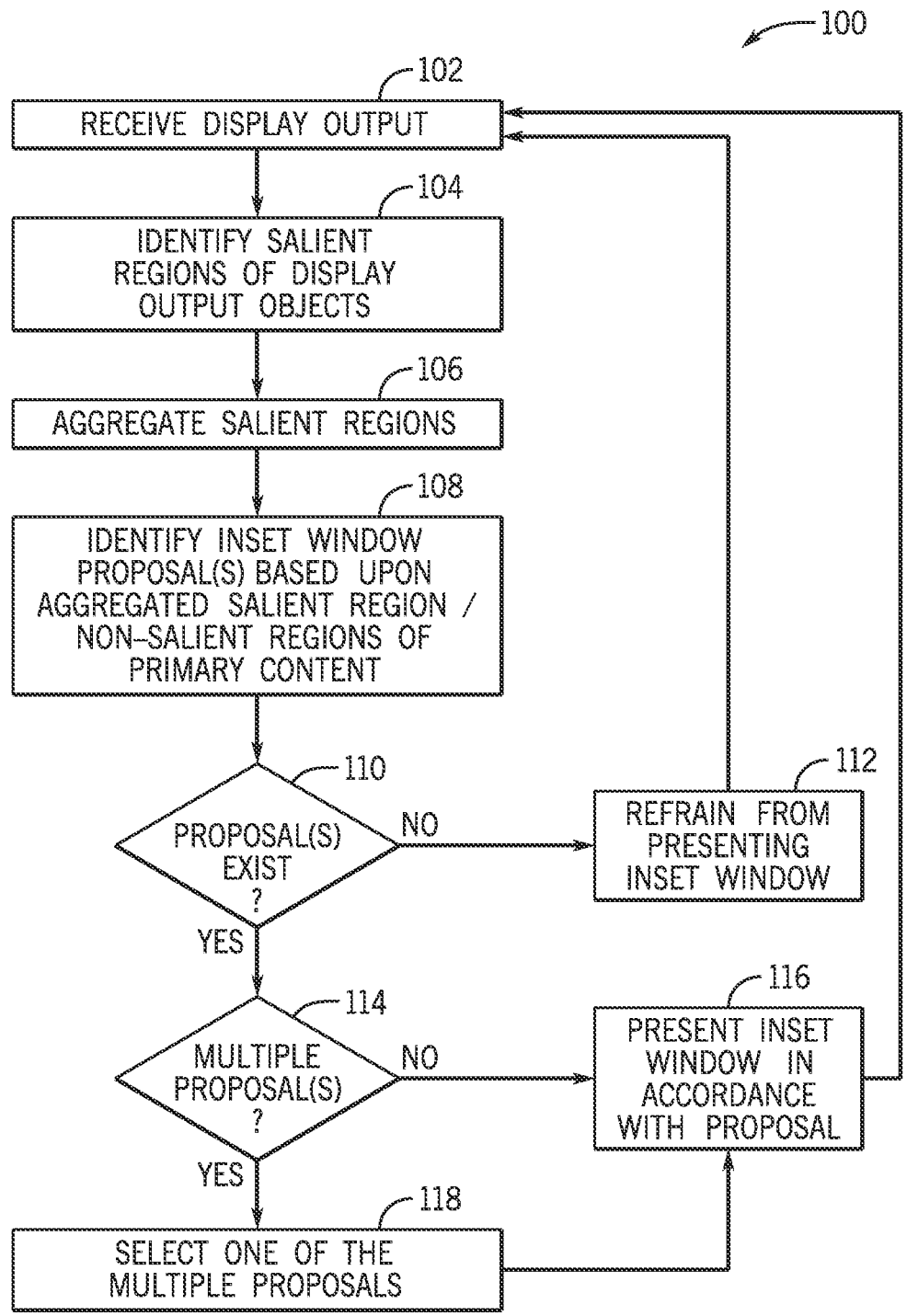
FIG. 10 is a flowchart, illustrating a process for identifying adaptive inset window settings based upon salient regions of content, in accordance with an embodiment of the present disclosure.

Having discussed various examples of electronic devices that may implement adaptive inset windows for providing supplemental content, the discussion now continues with a brief example of provision of an adaptive inset window that adjusts based upon object features within the primary content. FIGS. 7-9 depict examples of presentation content generated via presentation software (e.g., Keynote® by Apple®), where automatic provision of an adaptive inset window is requested and provided. FIG. 10 is a flowchart, illustrating a process 100 for identifying adaptive inset window settings based upon salient regions of content, in accordance with an embodiment of the present disclosure. For simplicity, these FIGS. will be discussed together.

As will be seen, an adaptive inset window may be provided based upon a request for such a window. The adaptive inset window may adapt to the primary content with which it will be presented. Specifically, non-salient regions of the primary content (e.g., as identified based upon the salient regions of objects of the primary content) may be used to identify changes to the adaptive inset window. In particular, a presentation status (e.g., on or off), a size, a shape, a location, etc. of the adaptive inset window may be adapted based upon the non-salient region within the primary content that is available for presentation of the adaptive inset window.

FIG. 7 is a schematic view of graphical user interface (GUI) 60 where adaptive inset window provision is requested, in accordance with an embodiment of the present disclosure. Specifically, GUI 60 illustrates a presentation edit mode interface of a presentation software. As illustrated, the GUI 60 includes a canvas 62 where objects (e.g., Text Boxes 64, 66, and 68) may be added to generate primary content (e.g., a presentation slide). Here, Text Boxes 64, 66, and 68 are inserted as part of a template for a title slide, which may be the first slide of a set of slides of the presentation.

The GUI 60 may include one or more options that may trigger a request for an adaptive inset window. For example, in the current embodiment, menu 70 includes a Live Video option 72 that, when selected, indicates a request for an adaptive inset window that provides live video. For example, the live video may include a "selfie" view of a presenter of the presentation, as depicted by the adaptive inset window 74 presented in response to selection of the Live Video option 72. Other options may be provided that may cause the automatic adaptive inset window functionality. For example, options to display other types of supplemental data, such as user feedback, notes, metadata, or other supplemental content within an adaptive inset window may be provided. When one or more of these options is selected, the adaptive inset window functionality may be triggered to display the supplemental content.

As mentioned herein, the adaptive inset window 74 may adjust and/or adapt to objects of the primary content (e.g., slide). For example, non-salient regions of the primary content may be identified by aggregating the salient regions of objects within the primary content. The adaptive inset window 74 may adapt to fit within a non-salient region of the primary content and/or may adapt to refrain from presentation when no suitable non-salient region exists for presenting the adaptive inset window 74 within a set of adaptation constraints imposed on the adaptive inset window 74 (e.g., a minimum size constraint, a presentation location, size, and/or shape constraint, etc.).

The adaptive inset window functionality, in one embodiment illustrated by process 100 of FIG. 10, begins with receiving a display output (e.g., the primary content) (block 102). In some instances, this display output may be in the form of list of objects, each object described by a path defining the shape of the object and coordinates defining where, in the primary content, the object is located/presented. In some embodiments, when additional metadata (e.g., descriptive content) of the objects exist, this may also be provided in association with the particular objects the metadata describes. In some instances, this metadata may be helpful in discerning a salient region of the objects, which may be used in determining the settings of the adaptive inset window 74. Thus, the display output, with respect to FIG. 7 may include a list of the Text Boxes 64, 66, and 68, their boundaries, their relative locations within the primary content, and/or metadata (e.g., describing the contents of these text boxes).

The process 100 continues with identifying the salient regions of the objects provided in the output data (block 104). As will be discussed in more detail below, the non-salient regions of the primary content may be derived based upon salient regions of objects within the primary content. As objects change, their salient regions may also change. For example, in FIGS. 7-9 features of the Text Boxes 64, 66, and 68 are shown changing over time, resulting in adaptation by the adaptive inset window 74.

Starting first with FIG. 7, the text inside the Text Boxes 64, 66, and 68 may be default text that will not be presented in a presentation mode of the slide, if it is not changed. An indication that the text boxes contain default text may be provided in the metadata of the display output. Because default text is not displayed in presentation mode, this default text may not provide an indication of an actual salient region of the Text Boxes 64, 66, or 68 as it is unclear whether any text or text expanding the entire extent of the Text Boxes 64, 66, and 68 will be used. Accordingly, in the current embodiment, the full extent/size of the Text Boxes 64, 66, and 68 are used to identify particular salient regions 76 of the slide. In alternative embodiments, other handling of default text may be used, such as using the size/length of the default text to derive the salient regions.

As depicted, the salient regions 76 may include an important presentation region of the objects and, optionally, one or more padding buffer(s) 78 around the objects. The padding buffer(s) 78 may ensure that there is a gap between the actual important presentation regions of the objects and the borders of the adaptive inset window 74.

Further, as will be discussed in more detail below, the salient regions 76 in an edit mode may differ from salient regions in a presentation mode. For example, as mentioned above, the default text will not be presented in presentation mode. Accordingly, if no replacement text is provided for the Text Boxes 64, 66, and 68, there may be no important presentation regions with respect to these text boxes in presentation mode. Accordingly, in presentation mode, the slide may be identified as lacking any salient regions or "empty" and/or as having a large non-salient region that the adaptive inset window can be placed within, thus allowing the adaptive inset window to be presented with a large size.

Once the objects' salient regions are identified, the salient regions of each of the objects are aggregated to identify a total salient region of the primary content (block 106). The aggregation of the salient regions 76 may be used to determine non-salient regions where the adaptive inset window 74 may be presented within the primary content (e.g., slide). In some embodiments, during the aggregation process, when salient region borders are within a threshold value, the non-salient regions between these borders may be aggregated into the salient region, creating a contiguous salient region between salient regions of different objects that are within a threshold closeness.

Once the salient regions and/or conversely, their non-salient regions are determined, adaptive features of the adaptive inset window 74 and/or proposals for presentation of the adaptive inset window 74 may be determined (block 108). Proposals for the adaptive features of the adaptive inset window 74 may be derived based upon pre-defined adaptive inset window constraints that provide requirements for the adaptive inset windows to meet during presentation in the primary content. For example, these constraints might include a requirement that the adaptive inset window not overlap any salient regions of the primary content, may require bounds to adaptation, such as only transitioning a certain threshold size or relative location per refreshed adaptation (e.g., per adjustment of the adaptive inset window from slide to slide), and/or other constraints, such as limiting presentation and/or requiring particular content when certain portions (e.g., the first and/or last slide of a slide presentation) are presented. Based upon these constraints, presentation proposals (e.g., defining adaptive settings of the adaptive features) of the adaptive inset window 74 are determined.

Next, at decision block 110, a determination is made as to whether one or more proposals exist. If no proposals exist (e.g., because the constraints cannot be satisfied given the salient regions of the objects presented in the primary content), then the process 100 refrains from presenting the adaptive inset window 74 (block 112). An example of this is provided in FIG. 15, which is described in more detail below. The process 100 may repeat as object features change.

When proposals do exist, a determination may optionally be made to determine whether multiple proposals exist (decision block 114). If only one proposal exists, the single proposal is selected and the adaptive inset window 74 is presented in accordance with the proposal (block 116).

However, when multiple proposals exist, one of the proposals is selected (e.g., based upon prioritized heuristics that may be used to identify a suitability of a particular proposal as opposed to other of the proposals) (block 118). The adaptive inset window 74 is displayed in accordance with the selected proposal (block 116).

For example, as illustrated in FIG. 7, a size proposal for the adaptive inset window 74 is sized in such a manner not to overlap the salient regions 76, while maintaining an optional sizing constraint requiring the aspect ratio of the adaptive inset window 74 to be maintained while sizing (e.g., thus not allowing a long and skinny adaptive inset window). As may be appreciated, many different sizes could be used, while still maintaining a minimum sizing constraint. Accordingly, heuristics may be used to identify an optimal size. For example, in one embodiment, it may be determined that the largest size that does not violate the constraints may be most desirable. In another embodiment, it may be determined that a size that matches an average shape size of the object of the primary content is the most desirable sizing. The selected proposal may most closely fit these desirability determinations.

Furthermore, while many locations may be possible for the adaptive inset window 74 (e.g., centered on the slide or adjacent to the Text Box 68), a preferred location may be selected, based upon default location preferences specified within the adaptive inset window software functionality and/or based upon an optimal alignment between objects in the primary content. For example, in the current embodiment, the adaptive inset window 74 is aligned to external edges of the objects (e.g., the right edge of text boxes 64 and 66 and the bottom edge of text box 68). This alignment is chosen based upon creating a "squared off" look with the objects in the primary content. In some embodiments, the best alignment for the adaptive inset window 74 may be determined based upon the placement that includes the most object alignments (e.g., alignment between an edge of the adaptive inset window 74 and at least one edge of an object).

As mentioned above, as objects change and/or a pre-indication of an upcoming object change is provided, the process 100 may repeat to identify new proposals based upon the object changes. The adaptive inset window 74 may change (e.g., be presented in accordance with the newly selected proposals) as these object changes occur.

For example, turning now to FIG. 8, FIG. 8 is a schematic view of the GUI 60 of FIG. 7 in edit mode, where the adaptive inset window 74 adapts to salient regions defined by edits to the objects (e.g., Text Boxes 64, 66, and 68) of the primary content, in accordance with an embodiment of the present disclosure. As illustrated, the text in the Text Boxes 64, 66, and 68 have be modified from the default text. The modified text may represent the actual text to be presented. Accordingly, salient regions of the Text Boxes 64, 66, and 68 may be identified based upon this text. Blank areas within text boxes that do not include text of the text boxes may be deemed non-salient, as this area of the text box may be considered a placeholder area that does not provide any presentation data. Accordingly, as indicated by the dashed boxes, the salient regions 76 of the Text Boxes 64, 66, and 68 may be identified as an area including the text, but not the blank areas 80 of these text boxes. As may be appreciated, this change may result in a smaller salient region within the primary content and, thus, a larger non-salient region where the adaptive inset window 74 may reside. Accordingly, as depicted, the adaptive inset window 74 adjusts to a larger size that fits within the larger non-salient region.

Turning now to presentation via presentation mode, FIG. 9 is a schematic view of a presentation mode GUI 90 rendered from the edits to the content described in FIG. 8, in accordance with an embodiment of the present disclosure. The adaptive inset window functionality may be executed upon edits of objects in the edit mode and/or upon presentation of objects in presentation mode. As will be described in more detail below, in presentation mode, adaptation of the adaptive inset window 74 may occur at the beginning of presentation of the primary content (e.g., before the objects are displayed), after the objects are displayed, or may adapt during display and/or changes to the objects during presentation of the primary content. As illustrated, the outlines of the Text Boxes 64, 66, and 68 are not displayed in presentation mode (though they may be displayed in edit mode). As in FIG. 8, the adaptive inset window 74 is adapted to the salient regions 76 of the Text Boxes 64, 66, and 68, despite the actual borders of these text boxes extending beyond the salient regions 76.

Figure 11:
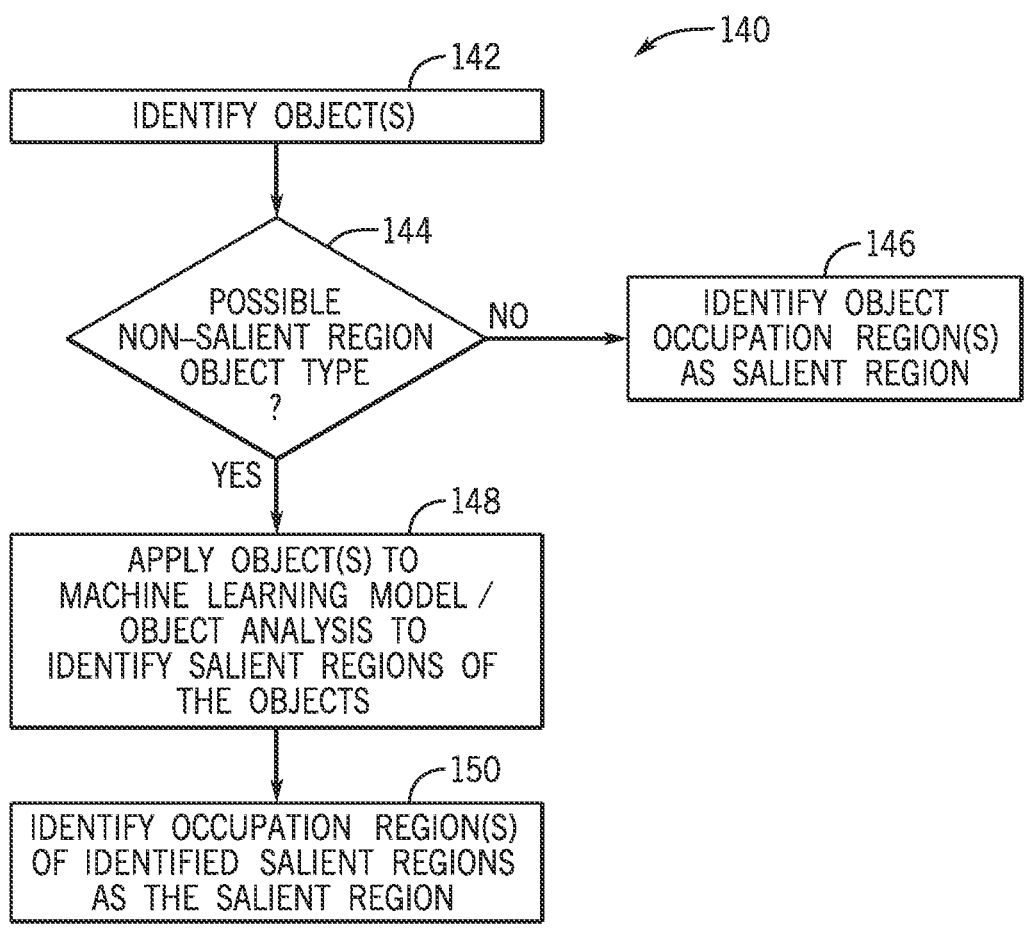
FIG. 11 is a flowchart, illustrating a process for detecting salient regions of objects within content, in accordance with an embodiment of the present disclosure.

Having discussed the basic adaptive inset window functionality, the discussion now turns to a more detailed discussion of identifying the salient regions of the objects. FIG. 11 is a flowchart, illustrating a process 140 for detecting salient regions of objects within content, in accordance with an embodiment of the present disclosure. The process 140 begins with identifying objects of the primary content that may impact presentation proposals for the adaptive inset window 74 (block 142). For example, objects that, when displayed, have a salient region that should not be overlapped by adaptive inset window 74 would be identified. Objects that do not impact the display of the adaptive inset region (e.g., do not have a salient region) may be filtered from the identified objects.

Next, a determination is made as to whether the objects may be of a type identified as possibly including a non-salient region (decision block 144). For example, a pre-defined list of object types may indicate particular types of objects that may include non-salient regions that may be overlapped by the adaptive inset window 74. As mentioned above, text boxes may have a non-salient region after the text contained in the text box. Further, as another example, images may include areas that are not of particular interest and that may be overlapped. Other object types may be identified as object types that should be treated as if the whole footprint of the object is a salient region. For example, while charts and/or graphs may include some blank area, it may be important, in some embodiments, to not breakup the chart data and the axes of the chart. Accordingly, these object types may be indicated as wholly salient. As another example, shapes and/or videos, in some embodiments may be indicated as wholly salient, not including a non-salient region.

If an object type is indicated as not possibly including a salient region, an entire occupation region of the object is defined as the salient region of the object (block 146). The occupation region may, in some embodiments, include all aggregated regions where the object may occupy in the primary content between refreshed adaptation of an adaptive inset window 74. For example, if an animation effect is applied to an object in between executions of the adaptive inset window functionality (e.g., between adaptation changes of the adaptive inset window), each of the regions that the salient region occupies during the animation may be aggregated into an overall salient region of the object.

If however, an object is an object type that is indicated as possibly including a non-salient region, the object may be applied to a machine learning model and/or a subsequent object analysis to identify salient regions of the object (block 148). For example, an object analysis of text box objects may include identifying the salient region of the text box as the area where the text contents are positioned and/or a non-salient region where the text contents are not found. For image analysis, a machine learning model may be applied to the image to identify salient features/regions of the image and/or non-salient features/regions of the image.

Once the salient regions and/or non-salient regions of these objects are determined, the finalized salient region of the object may be defined by the aggregated occupation regions of the identified salient regions of the object (block 150). Thus, any areas where the salient region of the objects may occupy between updates of the adaptive inset window may be identified as a part of the finalized salient region of the object.

Figure 12:
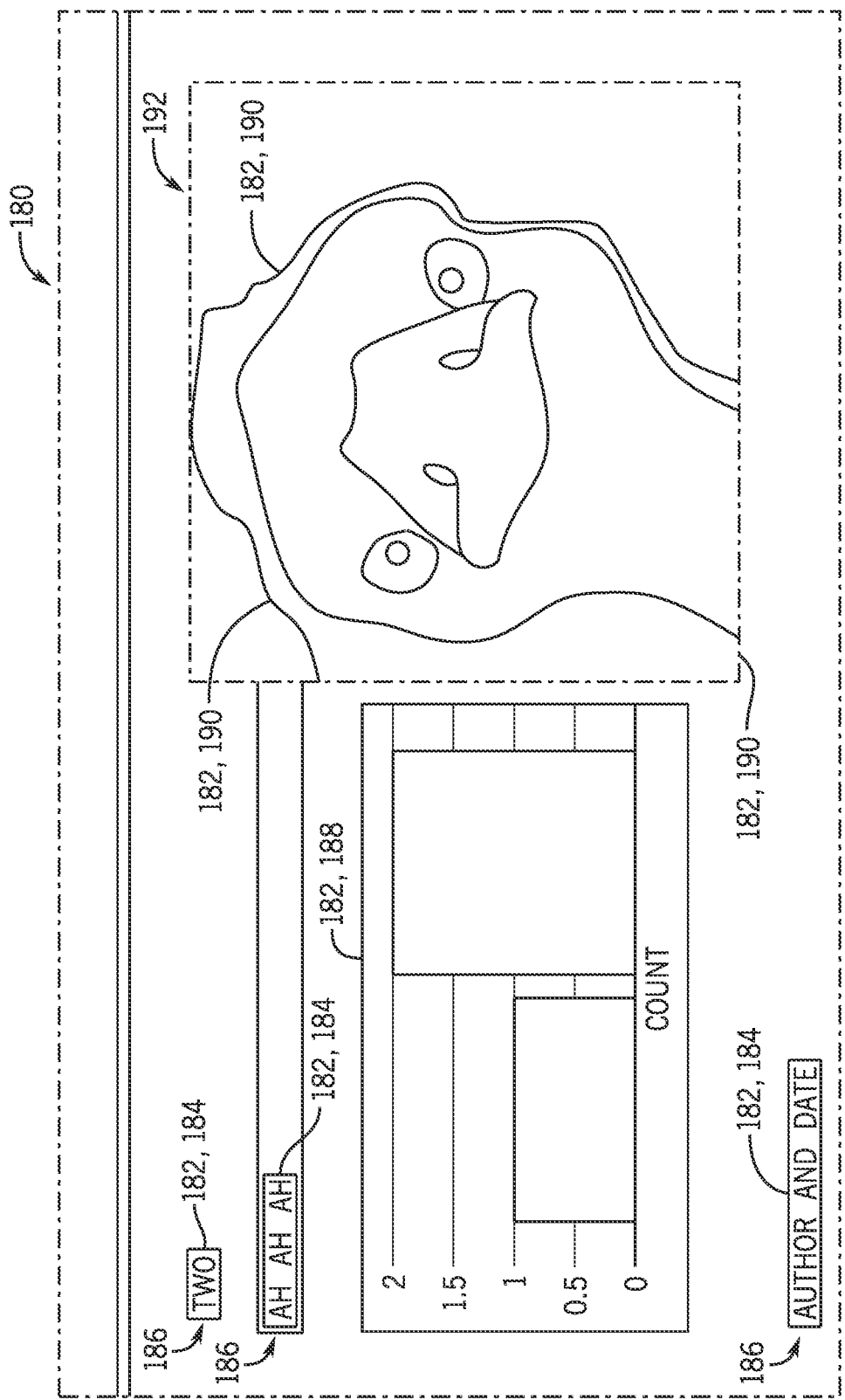
FIG. 12 is a schematic diagram, illustrating an example of identification of salient regions of objects contained within content, in accordance with an embodiment of the present disclosure.

FIG. 12 is a schematic diagram, illustrating a GUI 180 providing an example of identification of salient regions 182 of objects contained within content, in accordance with an embodiment of the present disclosure. As illustrated by the shaded regions in FIG. 12, the salient regions 182 provided in the current example include text box salient regions 184, where the salient region is defined by the size of text content within the text boxes 186 rather than the size of the text boxes 186; a chart salient region 188, where the entirety of the chart is used to define the salient region 188; and an image salient region 190, where a machine learning model is used to derive an important part of the image 192 to define the image salient region 190. As depicted, important areas/features are identified as part of the image salient region 198, while background and/or other non-important features of the image 192 are not defined as part of the image salient region 190.

Figure 13:
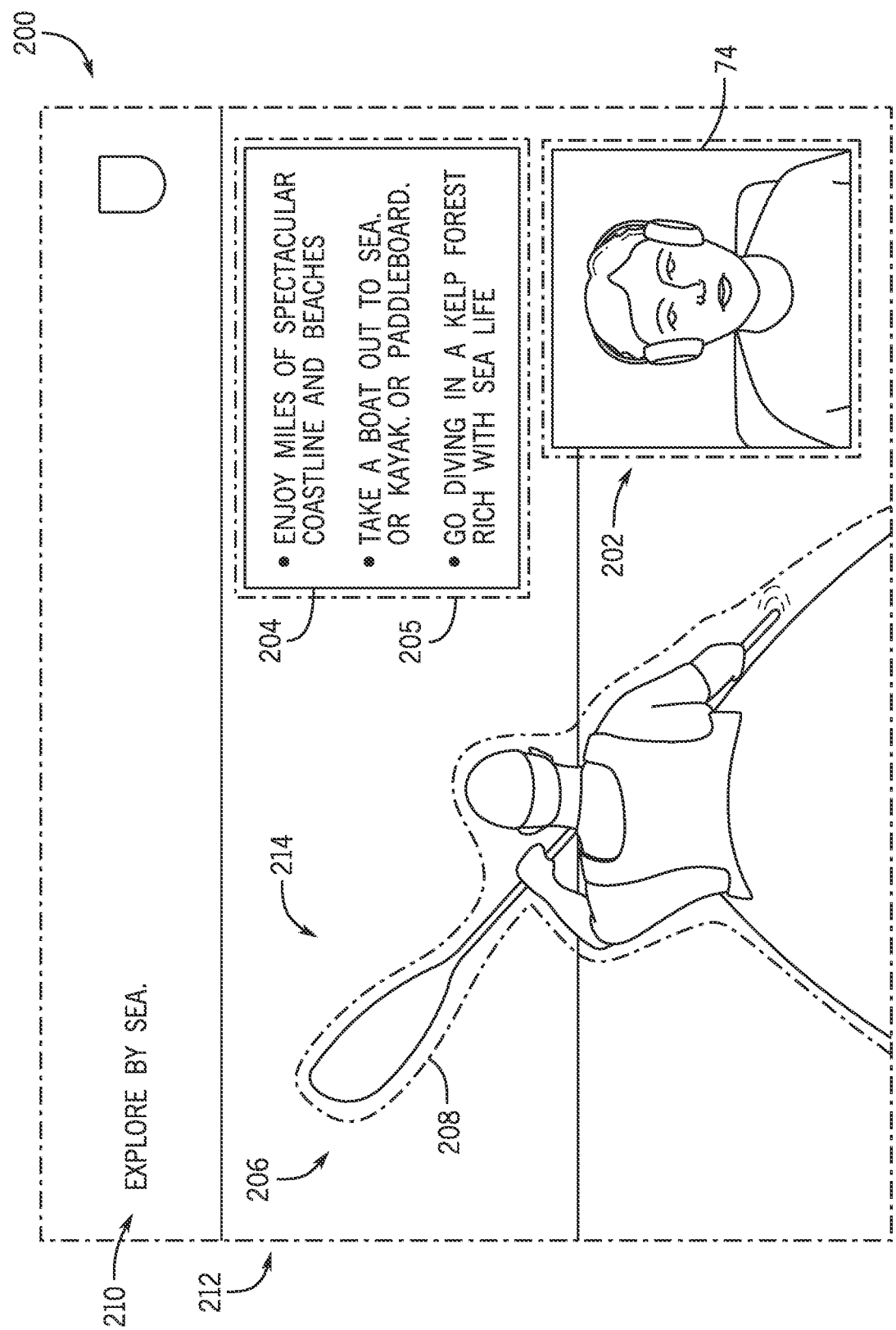
FIG. 13 is a schematic diagram, illustrating an example of provision of an adaptive inset window over a non-salient region of an image provided in content, in accordance with an embodiment of the present disclosure.

Having discussed the process for identifying the salient region of objects and ultimately an entirety of the primary content, the discussion now turns to a discussion of how the salient regions may impact presentation of adaptive inset window. First, FIG. 13 is a schematic diagram, illustrating an example of provision of an adaptive inset window 74 over a non-salient region 202 of provided content 200, in accordance with an embodiment of the present disclosure. As illustrated, the provided content 200 includes a text box 204, where the entirety of the text box 204 is deemed a text box salient region 205, (e.g., which, in some embodiments, such as the one depicted in FIG. 13, may be the case when there is a color fill within the text box 204, even when the text does not fully span the size of the text box 204). Further, the content 200 includes an image 206, where the salient region 208 may be identified via machine learning, as discussed above. Additionally, a banner 210 is present and the entirety of the banner 210 may be identified as a banner salient region 212.

The non-salient region 214 is defined as the area not within a salient region of any of the objects of the content 200. Proposals for the placement of the adaptive inset window 74 are identified based upon the constraints of presentation of the adaptive inset window 74. Here, non-salient region 202 is identified as a place to present the adaptive inset window 74, where the adaptive inset window 74 is sized to fit within the non-salient region 202.

Figure 14:
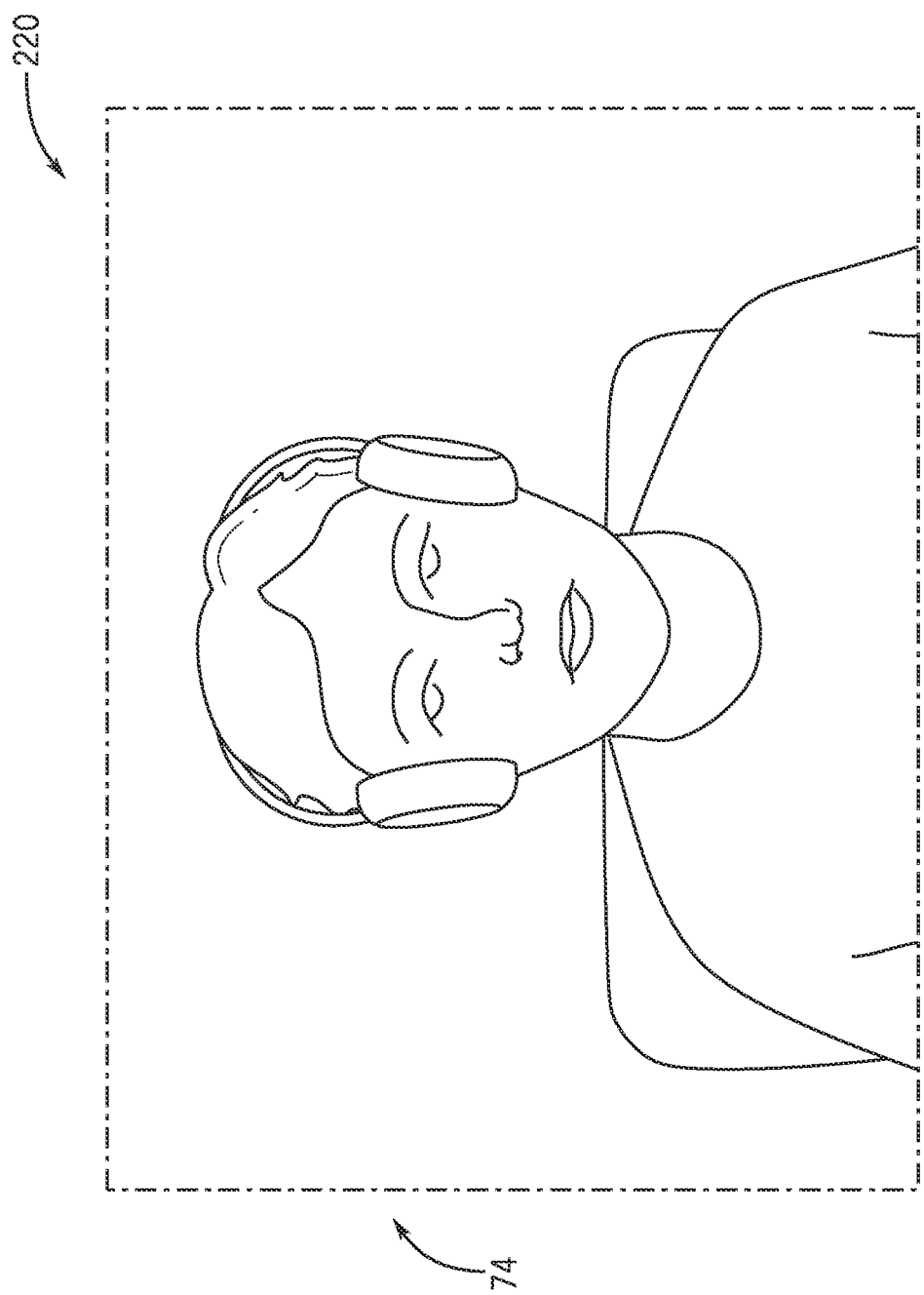
FIG. 14 is a schematic diagram, illustrating an example of provision of an adaptive inset window, resized to span a large portion of the content, based upon the lack of objects within the content, in accordance with an embodiment of the present disclosure.

Turning to another example, FIG. 14 is a schematic diagram, illustrating an example of presentation of content 220 along with provision of an adaptive inset window 74. Here, content 220 is empty, devoid of objects. Accordingly, the adaptive inset window 74 is resized to span a large portion of the content 220, based upon the lack of objects within the content 220.

Figure 15:
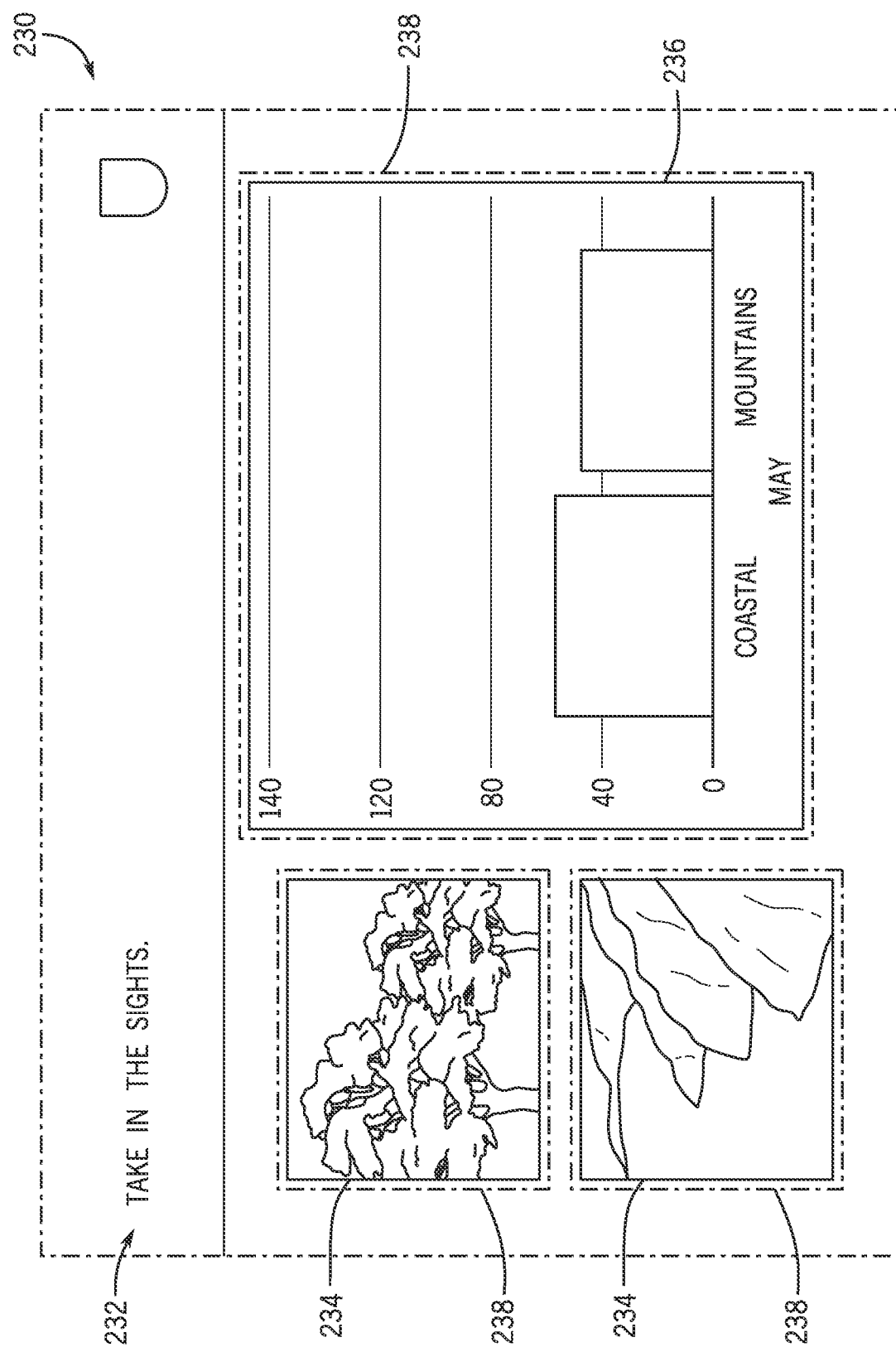
FIG. 15 is a schematic diagram, illustrating an example of refraining from provision of the adaptive inset window, based upon a lack of non-salient regions where the adaptive inset window may be presented within the content, in accordance with an embodiment of the present disclosure.
Figure 16:
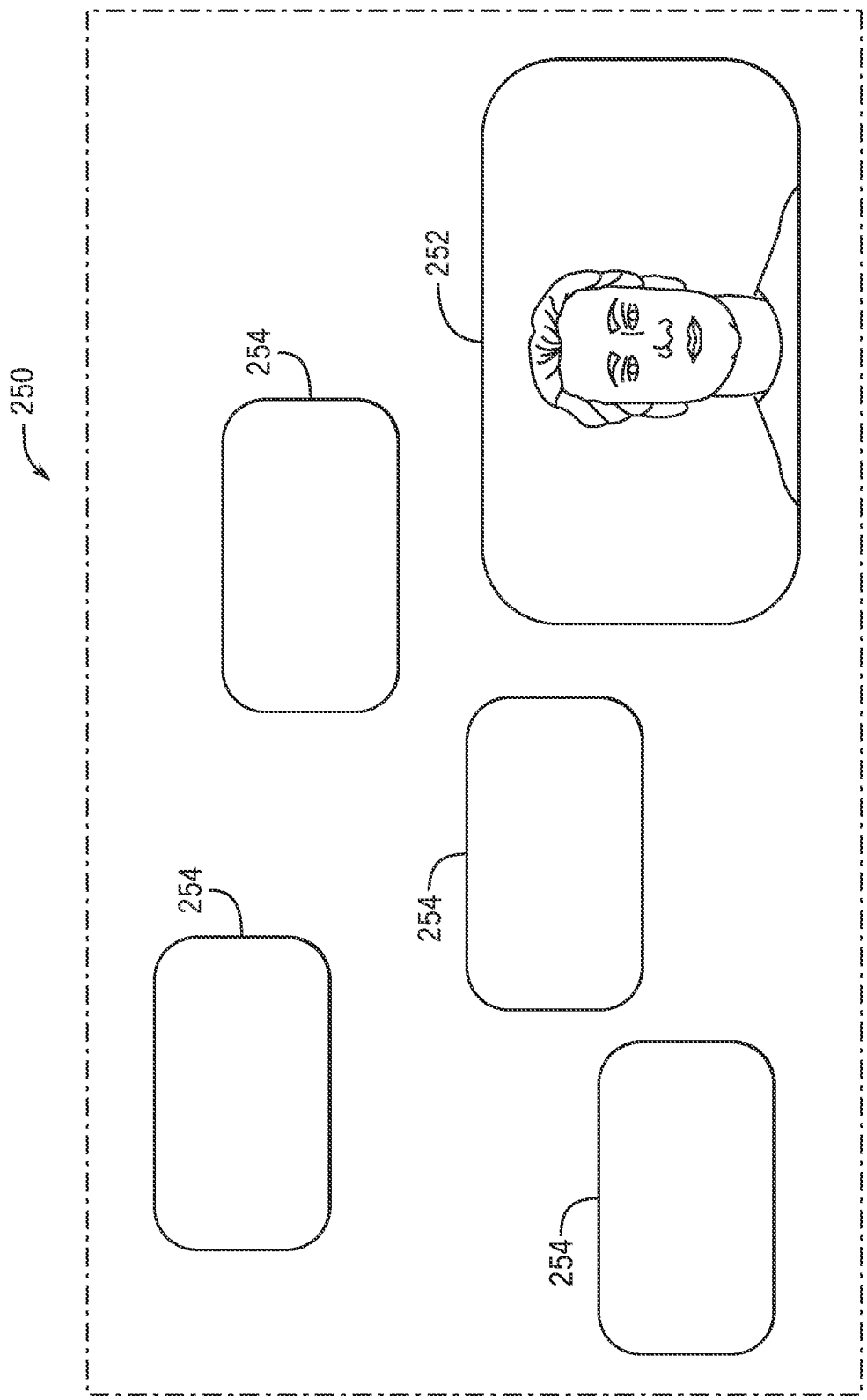
FIG. 16 is a schematic diagram, illustrating an example of automatic shaping of the adaptive inset window to maintain a cohesive shaping with other objects within the content, in accordance with an embodiment of the present disclosure.

Conversely, when the content includes a number of objects with salient regions covering the content in a manner where no suitable non-salient region exists to present the adaptive inset window 74 in accordance with the presentation constraints, presentation of the adaptive inset window 74 may be refrained from. Turning to another example, FIG. 15 illustrates presentation of content 230 where such refraining from provision of the adaptive inset window 74 is implemented. As illustrated, the content 230 includes a banner object 232, two image objects 234, and a chart object 236. Each of these objects, in the current embodiment, are identified as having a salient region 238 that spans their entire object. Accordingly, lack of non-salient regions where the adaptive inset window may be presented within the content, in accordance with an embodiment of the present disclosure;

FIG. 16 is a schematic diagram, illustrating a GUI 250 providing presentation of primary content with an adaptive inset window 252 that adapts with automatic shaping to maintain a cohesive shaping with other objects within the content, in accordance with an embodiment of the present disclosure. For example, as illustrated, the primary content in GUI 250 includes a set of rounded rectangles 254. In some embodiments, the adaptive inset window functionality may identify shape patterns within the primary content and may adapt the shape of the adaptive inset windows 252 to be a cohesive shape with the identified shape pattern. In the illustrated example, all of the presented objects include a similar shape (e.g., a rounded rectangle). Accordingly, as depicted, the adaptive inset window 252 is shaped to a similar shape (e.g., a rounded rectangle). The cohesive shape adaptation may identify many different types of shape patterns and adapt accordingly. For example, shape adaptations may include identifying repeating shape patterns (e.g., circle, circle, square, circle, circle, square) and may identify an adaptation shape based upon where in the pattern the adaptive inset window 252 will be positioned). The cohesive shape adaptation may also identify shape sizes and/or shape size patterns and a size of the adaptive inset window 252 may be adjusted to maintain a consistence shape size with the identified shape sizes and/or shape size patterns identified. In some embodiments, the cohesive shape adaptation functionality may be triggered upon a particular pattern confidence threshold. For example, in some embodiments, the cohesive shape adaptation functionality may trigger only upon identifying that 100% of applicable shaped objects match a pattern. In other embodiments, the threshold may be lowered to allow the cohesive shaping functionality to adapt shape upon a less confident identification of a pattern.

Figure 17:
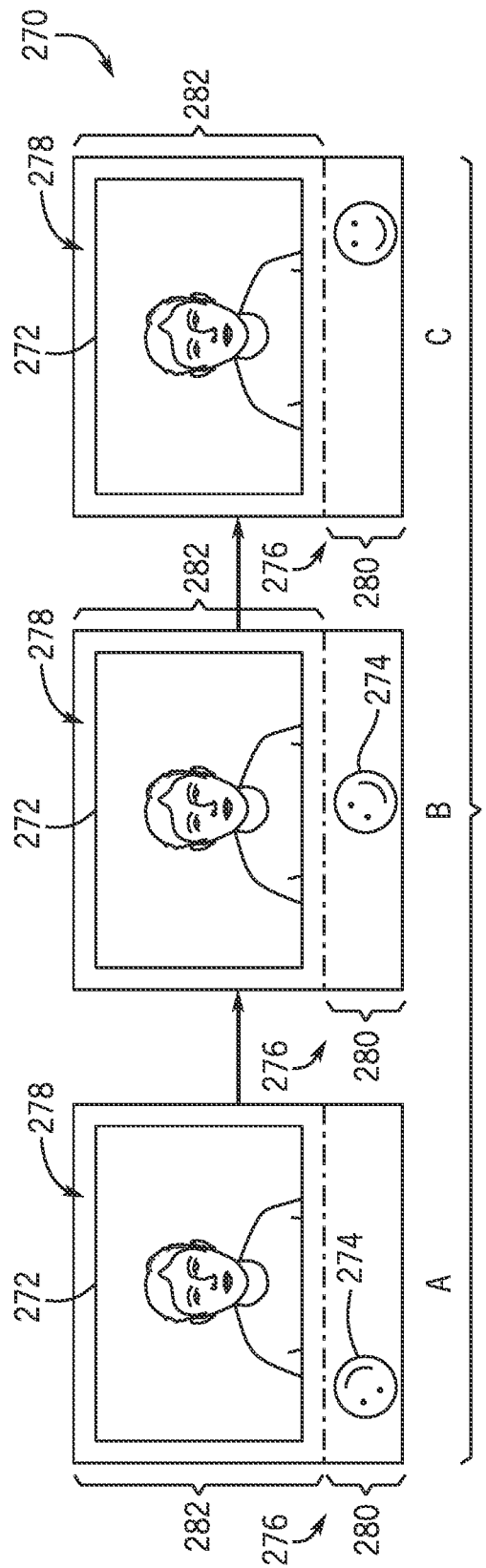
FIG. 17 is a schematic diagram, illustrating an example of provision of an adaptive inset window, adapted to avoid salient regions of an animation in content, in accordance with an embodiment of the present disclosure.
Figure 18:
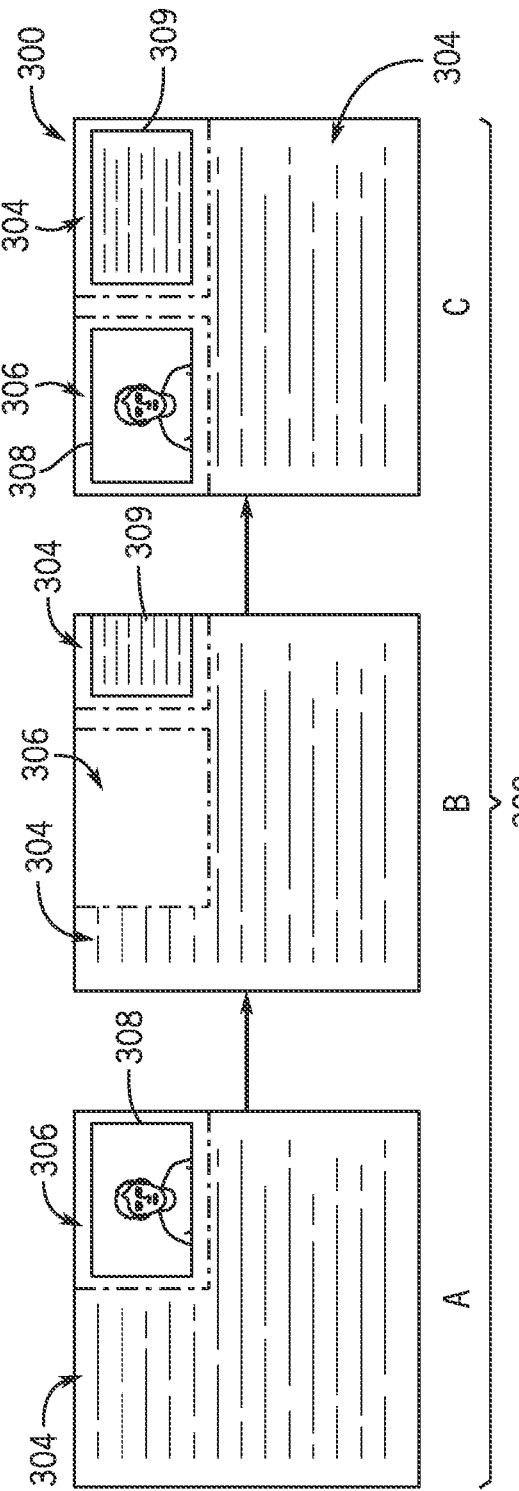
FIGS. 18 and 19 are schematic diagrams, illustrating examples of provision of an adaptive inset window, adapted to avoid salient regions of an animation in content at certain particular intervals (e.g., key frames) of the animation, in accordance with an embodiment of the present disclosure.
Figure 19:
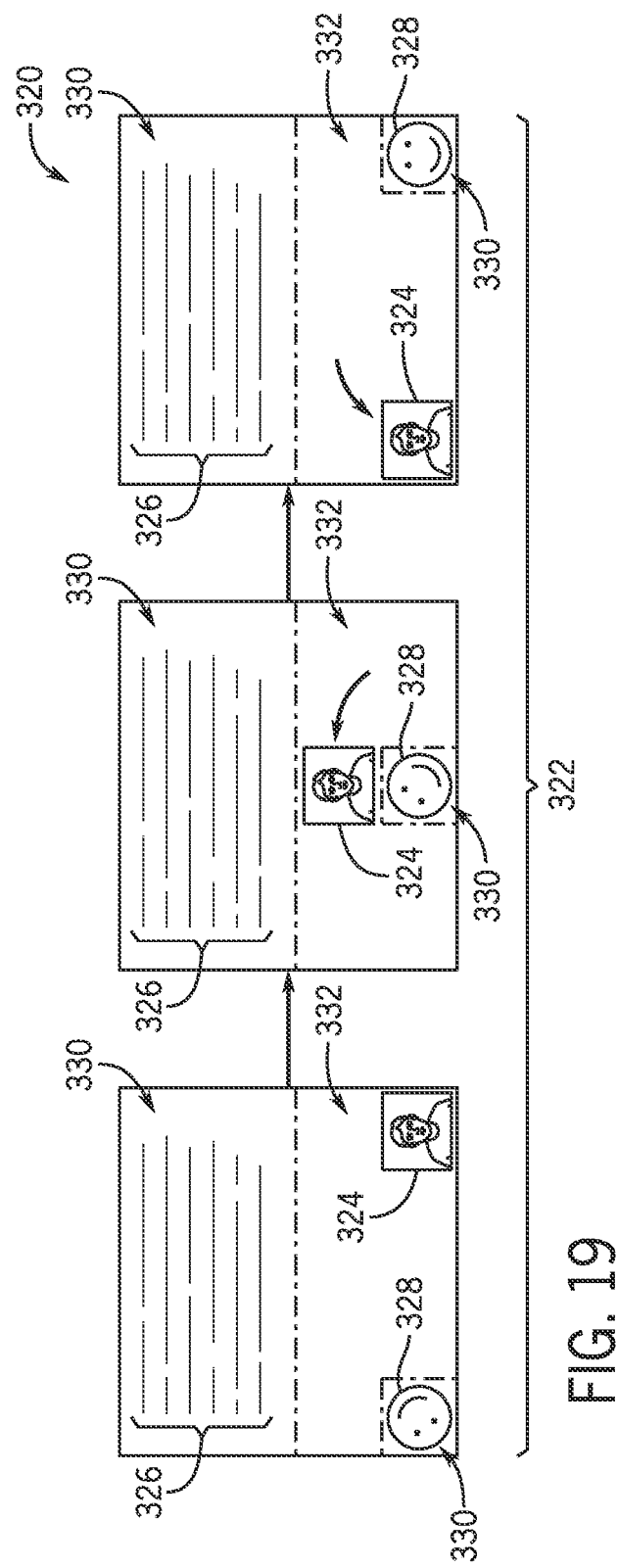

Turning now to examples of determining salient regions and respective adaptations of an adaptive inset window based upon animated objects, FIGS. 17-19 provide examples of adaptive inset windows that adapt based upon animated objects within primary content. Starting first with FIG. 17, FIG. 17 is a schematic diagram, illustrating an animation sequence 270, providing an example of provision of an adaptive inset window 272, adapted to avoid salient regions of an animation in content, in accordance with an embodiment of the present disclosure.

As illustrated in the A to B to C progression 273 of sequence 270, a smiley face 274 includes an applied animation effect that causes it to roll from left to right across the bottom-quarter 276 of the primary content 278. In the current embodiment, the salient region is defined at the primary content presentation (e.g., presented slide) level, meaning that the occupation regions of the animated object across the progression 273 are accumulated into an overall occupation region (e.g., including all areas the object is located during the presentation of the animation on the slide). Accordingly, as illustrated, the salient region 280 includes the entire bottom-quarter of the primary content 278, as the animated smiley face 274 has occupied this entire region and/or the animated object plus a padding area around the animated object has occupied this entire region. No other objects are presented in the primary content, Thus, as illustrated, the adaptive inset window 272 may be adapted to occupy the upper three-quarters 282 of the primary content.

In some embodiments, the adaptive inset window may adapt at incremental stages (e.g., key animation frames and/or animation build stages) of the primary content. FIGS. 18 and 19 are schematic diagrams, illustrating examples of provision of an adaptive inset window, adapted to avoid salient regions of an animation in primary content at certain key frames of the animation, in accordance with an embodiment of the present disclosure.

Starting first with FIG. 18, FIG. 18 illustrates an animation sequence 300 with an A to B to C progression 302. In progression step A, the salient region 304 is identified based upon the inclusion of an area of text within the primary content. Accordingly, a non-salient region 306 is identified. In the current example, the non-salient region 306 is identified as being suitable for containing an adaptive inset window 308, which is accordingly presented with the primary content.

At progression step B, a change in the primary content is presented. Specifically, object 309 is introduced into the primary content in an area that was formerly a non-salient region 306 (e.g., via a slide-in animation). As illustrated, this change impacts the salient region, by reducing the non-salient region 306. In the depicted example, the adaptive inset window functionality determines that the non-salient region 306 may no longer be suitable for presentation of the adaptive inset window 308. Accordingly, the adaptive inset window 308 is turned off (e.g., refrained from presentation), which may be done, in some embodiments, by setting presentation status metadata associated with the adaptive inset window 308 to an "off" indication.

At progression step C, the object 309 completes its animation. Further, a portion of the text is withdrawn from presentation. This results in a shift in the non-salient region 306, to include an area where the withdrawn text previously resided, while removing a portion of the non-salient region where the object 309 ended up in the presentation. In the current example, the adaptive inset window functionality determines that the non-salient region 306 is once again suitable for containing the adaptive inset window 308, resulting in re-presenting the adaptive inset window 308. As may be appreciated, this may be done, in some embodiments, by setting presentation status metadata associated with the adaptive inset window 308 to an "on" indication.

FIG. 19 illustrates an animation sequence 320 of A to B to C progression stages 322 where the adaptations of the adaptive inset window 324 are determined at each of the progression stages 322, while accounting for features of the totality of occupation of the objects of the primary content during the entire presentation of primary content (e.g., entire presentation of a slide). Specifically, the primary content includes text 326 and an animated smiley face shape 328. As illustrated, by the bounded salient region 330, the salient region 330 is identified at each of the progression stages 322. For example, in contrast to the salient region identified for the animated smiley face 274 of FIG. 17, which bounded the entire bottom-quarter of the primary content, because the salient region is identified at each of the progression stages 322 (e.g., which could be defined based upon key frames and/or animation frames), the salient regions are more closely tied to the objects at the particular progression stages 322. This creates more opportunity for placement of the adaptive inset window 324, as the non-salient regions 332 will, oftentimes, be larger under such a scheme of salient region determination. However, added complexity may arise, as the salient regions 330 may change at each of the progression stages 322. Accordingly, as with the example provided in FIG. 18, the adaptive inset window functionality may devise an adaptive presentation scheme for the adaptive inset window 324. In the current embodiment, the adaptive inset window 324 is adapted by applying an animation effect at the progression stages 322 to animate the adaptive inset window 324 to avoid the salient regions corresponding to these progression stages 322. Furthermore, certain features of the adaptive inset window (e.g., the size) may be determined based upon an overall understanding of occupation of the adaptive inset window 324 at an overall level within the primary content. For example, while the adaptive inset window 324 could be sized larger in progression steps A and B, as the non-salient regions 332 are large, this may require a shrinking of the adaptive inset window 324 in progression stage B, as there is limited non-salient region 332 between the bottom of the text 326 and the top of the smiley face shape 328. Accordingly, to maintain a consistent size, in the current embodiment, the adaptive inset window maintains the maximum available size that will avoid the salient regions 330 across the entirety of the progression stages 322. In this manner, the adaptation of the adaptive inset window 324 may factor in characteristics at a progression stage level as well as the overall primary content presentation level.

Figure 20:
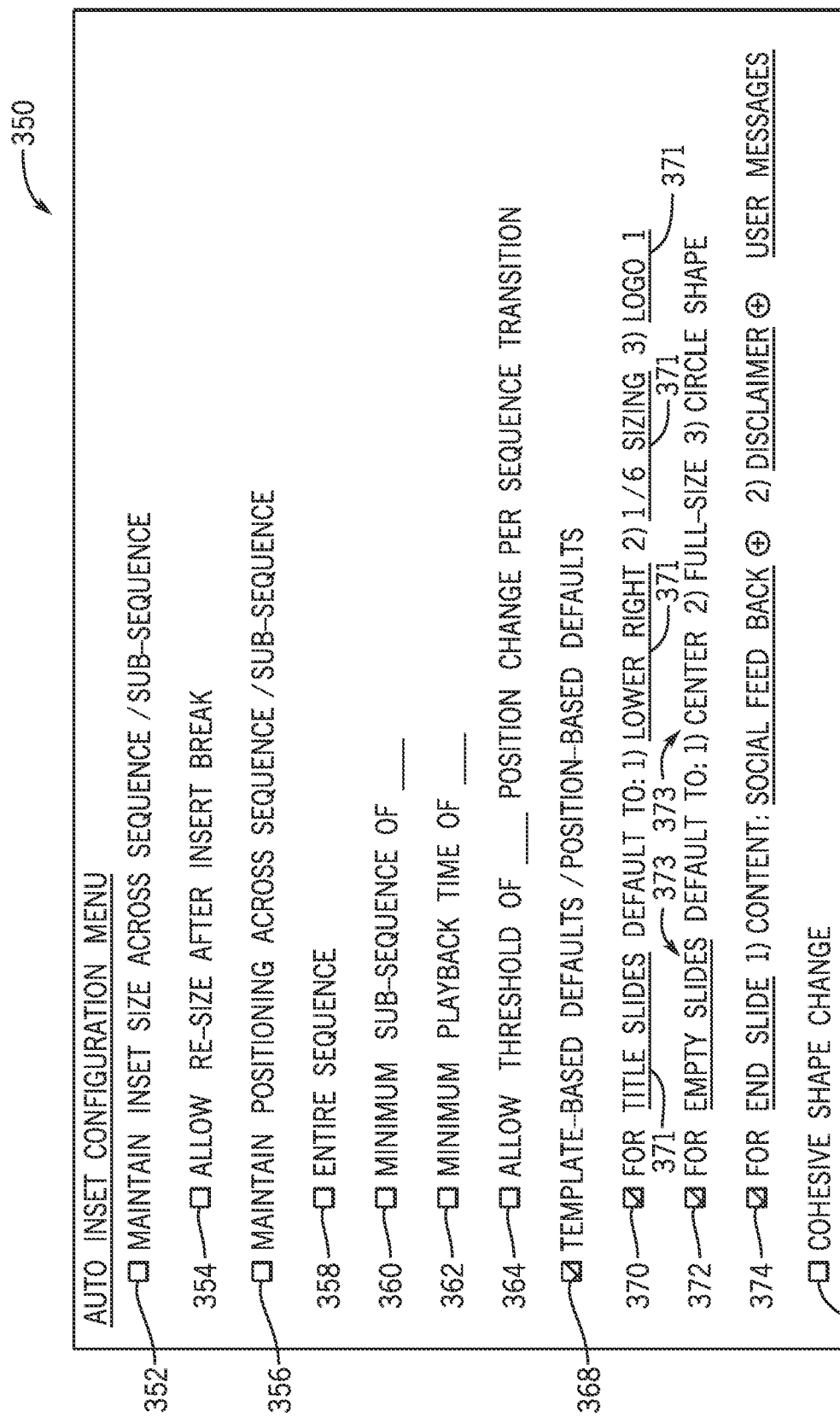
FIG. 20 is a schematic diagram, illustrating a GUI for facilitating configuration of optional adaptation actions for adaptive inset window, in accordance with an embodiment of the present disclosure.

As may be appreciated, a number of customizations may be implemented with automatic adaptation of an adaptive inset window. Further, in many cases, there may be different desires regarding how the adaptive inset window functionality should adapt the adaptive inset window. Accordingly, FIG. 20 is a schematic diagram, illustrating a GUI 350 for facilitating configuration of optional adaptation actions for an adaptive inset window, in accordance with an embodiment of the present disclosure. While many options are provided in the GUI 350, the current discussion is not intended to present an extensive list of all adaptation options that may be adjusted. Indeed, many other such adaptation options may be provided in the GUI 350 or other GUIs associated with adaptive inset window adaptations.

The GUI 350 includes options and corresponding affordances to turn on or off the corresponding option: The options depicted in the GUI 350 include:

Maintain Inset Size Across Sequence: Some constraints may look at previous adaptive inset window presentations presented with a previous presentation of primary content to limit adaptations that may be made with a current adaptive inset window that is to be presented with primary content subsequent to the previous primary content. Such constraints may be referred to as "portion-to-portion" constraints, as display of the adaptive inset window in one portion may affect display of the adaptive inset window in another portion. An option 352 to require an adaptive inset window to retain a particular size and/or a particular threshold size adaptation throughout a sequence and/or sub-sequence (e.g., throughout presentation of an animation on a slide, throughout a portion of the animation on a slide, and/or throughout presentation of all slides in a slide presentation embodiment). In some embodiments, the granularity of the sequence may be set. For example, the sequence may be set to all animation frames within a single slide, all slides presented in a slide presentation, a certain number of slides (e.g., 3 consecutive slides), etc. In some embodiments, a sub-option 354 may allow re-sizing of the adaptive inset window after a break in presentation of the adaptive inset window (e.g., when the adaptive inset window is refrained from presentation due to lack of non-salient space with which to present the adaptive inset window).

Maintain Inset Positioning Across Sequence: An option 356 to require an adaptive inset window to retain a particular location throughout a sequence (e.g., throughout presentation of an animation on a slide, throughout a portion of an animation presentation on a slide and/or throughout presentation of all slides in a slide presentation embodiment). In some embodiments, the granularity of the sequence may be set. For example, the sequence may be set to an entirety of the sequence (e.g., option 358), a minimum sub-sequence of X frames (option 360), a minimum playback time of X (option 362). Option 358, when selected, may require that any presentation of the adaptive inset window retain a common position across the entirety of the sequence (e.g., when presented). The option 360, when selected, will require that the adaptive inset window retain a position for at least X portions of the primary content making a sub-sequence (e.g., 3 slides). In this manner, the adaptive inset window will only be presented if the non-salient regions of the sub-sequence can support containment of the adaptive inset window in a common location across the sub-sequence. Option 362, when selected may require that enough non-salient region across the primary content be able to contain the adaptive inset window at a common position, for a specified time interval (e.g., 30 seconds) and otherwise refrain from displaying the adaptive inset window. To identify whether the time interval can be sustained, an average presentation time observed during a presentation rehearsal mode may be used to identify the salient and/or non-salient regions over time. In some embodiments, when the adaptive inset window is added after a presentation has been recorded, the actual timing of the recorded presentation may be used to identify the salient and/or non-salient regions over time. In addition to the above-described options, an option 364, when selected, may allow for changes in positioning up to a certain threshold at each transition in a sequence (e.g., at each slide change and/or at each frame of a presented animation).

Cohesive Shape Change: As mentioned above, a cohesive shape change option 366, when selected, may cause the adaptive inset window functionality to identify shape patterns in the primary content to be presented with the adaptive inset window and adjust the shape of the adaptive inset window in an attempt to create a cohesive shaping with the shapes of the objects in the primary content.

Template-Based Defaults/Position-Based Defaults: Option 368, when selected, causes the adaptive inset window functionality to identify other characteristics of the primary content to be presented with the adaptive inset window to affect the adaptations identified for the adaptive inset window. For example, a template type (e.g., Title Slide, Cover Page, etc.), location within the primary content (e.g., first page/slide, last page/slide, etc.) and/or particular contents (e.g., empty and/or objects with a cohesive subject matter (e.g., all animal image files) associated with the primary content may be used to adapt a size, shape, location, and/or content displayed within an adaptive inset window. For example, here, option 370, has been customized via affordances 371, to default to lower-right positioning at a 1/6 ratio of the primary content sizing, and with content presenting a logo (e.g., "logo1") for "Title Slide", which may be identified as slides using a Title Slide template and/or based upon being at a first position (e.g., first slide) in the primary content.

Further, option 372 illustrates default rules for primary content based upon particular content within the primary content. For example, here, option 372, via affordances 373, is customized to provide default centering, default full-view sizing, and a circle shaping of the adaptive inset window when the primary content is empty (e.g., void of presentation objects).

Option 374 includes a customized positioning-based option that, for the primary content at the end of the overall primary content (e.g., the end slide), defaults to providing content including: social media feedback (e.g., comments, like indicators, dislike indicators, etc.), a specified disclaimer content, and user-provided messages. Option 374 illustrates that sourced content provided by the adaptive inset windows may change. Indeed, while in some instances a selfie-video of the presenter may be provided in the adaptive inset window, option 374, when selected, will result in an aggregate of information from three different sources being presented within the adaptive inset window on the ending slide of the primary content.

Figure 21:
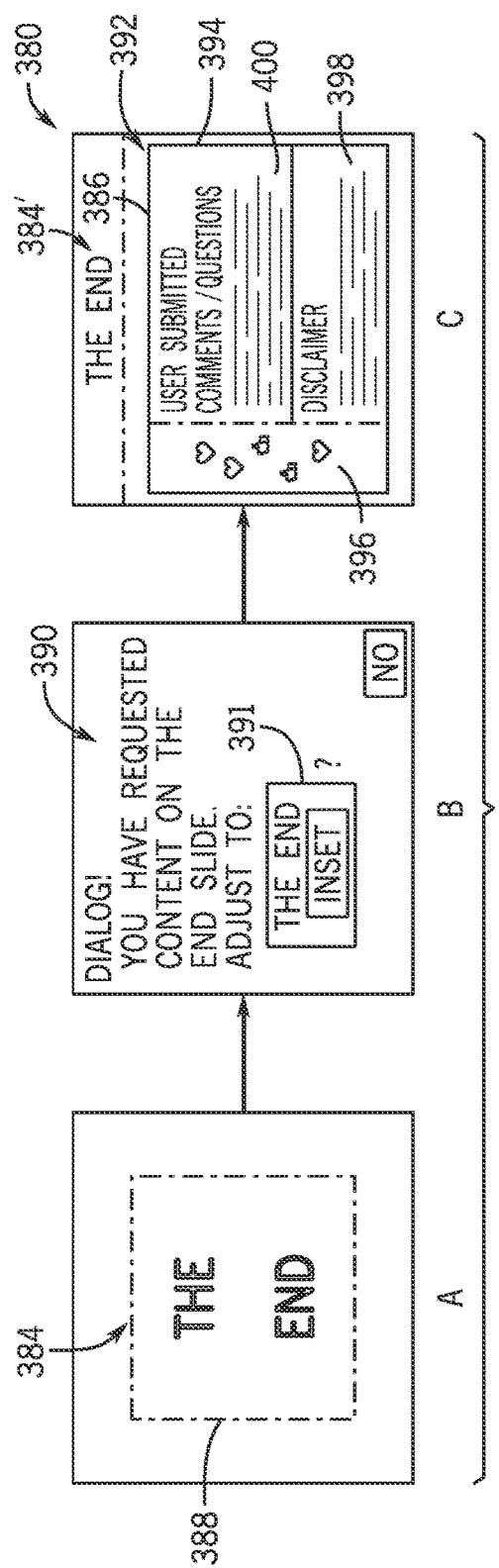
FIG. 21 is a schematic diagram, illustrating an example of alternative content provision within the adaptive inset window based upon features of the content, in accordance with an embodiment of the present disclosure.

In some embodiments, to meet the requested defaults specified in the GUI 350 or for other reasons, it may be desirable to adjust a layout of the primary content for more desirable presentation of the adaptive inset window. For example, FIG. 21 is a schematic diagram, illustrating a sequence 380 of an A to B to C progression 382, providing an example of adapting the primary content 384 for alternative content provision within the adaptive inset window 386, based upon features of the primary content and/or requested adaptation constraints for the adaptive inset window 386, in accordance with an embodiment of the present disclosure.

As illustrated in progression step A, the primary content comprises a text box 388 that spans a large portion of the primary content 384. The adaptive window functionality may determine that the option 374 of FIG. 20 is selected, and the primary content 384 is the end slide. Accordingly, the adaptive inset window functionality may determine that an inset window with social media feedback, disclaimers, and user messages has been requested for this particular primary content 384. The adaptive inset window functionality may discern that with the current objects and object characteristics in the primary content (e.g., the large spanning text box 388) that the requested adaptive inset window 394 and specified content cannot be displayed (e.g., due to lack of a suitable non-salient region). Accordingly, in response to such a determination, in progression step B, the adaptive inset window functionality, in some embodiments, may identify modifications to the primary content that will provide a suitable non-salient region for the adaptive inset window 394 and may provide a prompt 390, providing an indication of the proposal (e.g., with an image 391 representing the proposal).

Upon affirmation of the proposal, the primary content 384 may be adjusted into primary content 384', which will provide a non-salient region 392 that is suitable for containing the adaptive inset window 394. As illustrated, the adaptive inset window 394 presents content including social media feedback 396, disclaimers 398, and user comments 400, aggregated into a single adaptive inset window. In alternative embodiments, when multiple content types are requested, multiple adaptive inset windows may be presented, each with one of the multiple content types.

Figure 22:
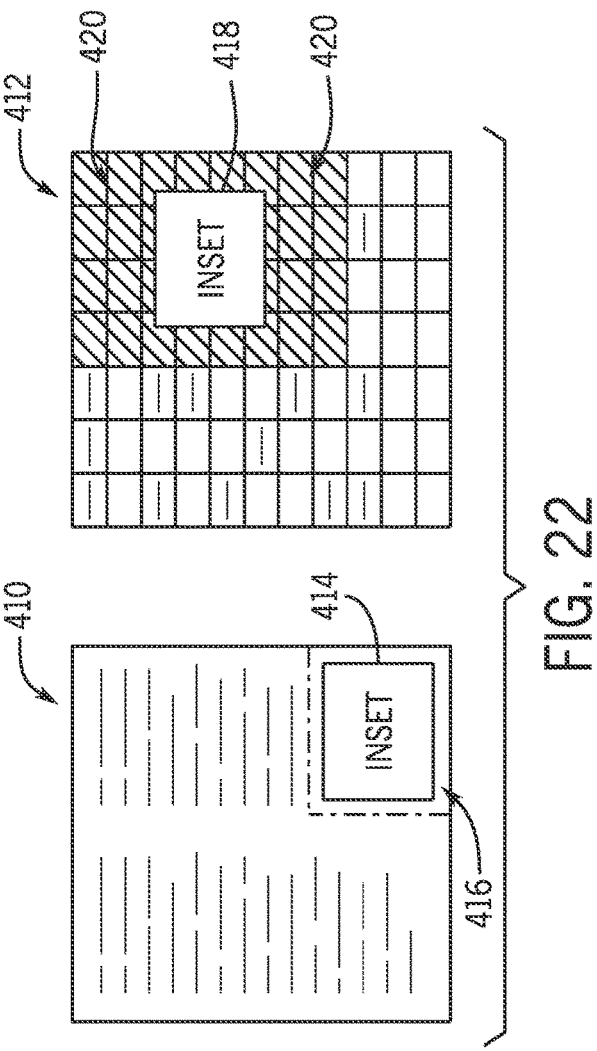
FIG. 22 is a schematic diagram, illustrating usage of the adaptive inset window in word processing and spreadsheet applications, in accordance with an embodiment of the present disclosure.

While the current discussion has primarily used slides of a slide presentation as the primary content with the adaptive inset window being presented in the edit mode and/or presentation mode of slide presentation software and adjusted at the slide transition and/or slide animation transition levels, the adaptive inset window techniques described herein may be used in many different applications and the exemplary application of slide presentations is not intended to limit the scope of the current techniques. Indeed, FIG. 22 is a schematic diagram, illustrating usage of the adaptive inset window in word processing content 410 and spreadsheet content 412, in accordance with an embodiment of the present disclosure.

In the word processing content 410, the adaptive inset window 414 is presented based upon identifying a non-salient region 416 suitable for containing the adaptive inset window 414. As the presentation of the word processing content 410 changes (e.g., based upon Page Up/Page Down and/or scrolling within a word processing application), the adaptive inset window functionality may re-determine adaptations for the adaptive inset window 414.

In the spreadsheet content 412, the adaptation of the adaptive inset window 418 may be derived based upon the non-salient region 420. The non-salient region 420 may be identified based upon contiguous areas of empty cells (e.g., non-populated cells) within a spreadsheet content 412.

The specific embodiments described above have been shown by way of example, and it should be understood that these embodiments may be susceptible to various modifications and alternative forms. It should be further understood that the claims are not intended to be limited to the particular forms disclosed, but rather to cover all modifications, equivalents, and alternatives falling within the spirit and scope of this disclosure.

The techniques presented and claimed herein are referenced and applied to material objects and concrete examples of a practical nature that demonstrably improve the present technical field and, as such, are not abstract, intangible or purely theoretical. Further, if any claims appended to the end of this specification contain one or more elements designated as "means for [perform]ing [a function] . . . " or "step for [perform]ing [a function] . . . " it is intended that such elements are to be interpreted under 35 U.S.C. 112(f). However, for any claims containing elements designated in any other manner, it is intended that such elements are not to be interpreted under 35 U.S.C. 112(f).

It is well understood that the use of personally identifiable information should follow privacy policies and practices that are generally recognized as meeting or exceeding industry or governmental requirements for maintaining the privacy of users. In particular, personally identifiable information data should be managed and handled so as to minimize risks of unintentional or unauthorized access or use, and the nature of authorized use should be clearly indicated to users.

What is claimed is:

1. A tangible, non-transitory, computer-readable medium, comprising computer-readable instructions that, when executed by one or more processors of a computer, cause the computer to:
   render, in a graphical user interface (GUI) of a slide presentation application, an affordance to provide a live video feed in one or more slides of a presentation to be presented by the slide presentation application;
   receive an indication of selection of the affordance;
   in response to receiving the indication of the selection of the affordance, insert an inset window into the one or more slides of the presentation, the inset window having an inset window location, size, shape, or any combination thereof that provides an indication of a live video feed location, size, shape, or any combination thereof that will be provided in the one or more slides;
   receive, via the GUI, an indication to present the presentation;
   capture the live video feed from one or more input devices communicatively coupled to the computer; and
   in response to receiving the indication to present the presentation, present the presentation with the live video feed.

2. The tangible, non-transitory, computer-readable medium of claim 1, comprising computer-readable instructions that, when executed by the one or more processors of the computer, cause the computer to:
   identify one or more characteristics of the one or more slides of the presentation;
   determine, based upon the one or more characteristics of the one or more slides of the presentation:
      the inset window location, size, shape, or any combination thereof,
      the live video feed location, size, shape, or any combination thereof, or
      both.

3. The tangible, non-transitory, computer-readable medium of claim 2, comprising computer-readable instructions that, when executed by the one or more processors of the computer, cause the computer to:
   identify a template of the one or more slides; and
   determine, based upon the template of the one or more slides:
      the inset window location, size, shape, or any combination thereof,
      the live video feed location, size, shape, or any combination thereof, or
      both.

4. The tangible, non-transitory, computer-readable medium of claim 3, comprising computer-readable instructions that, when executed by the one or more processors of the computer, cause the computer to:
   determine a first template of a first slide;
   determine a second template of a second slide that is different than the first template;
   determine, based upon the first template:
      a first inset window location, size, shape, or any combination thereof for the first slide, a first live video feed location, size, shape, or any combination thereof for the first slide, or both; and determine, based upon the second template:
a second inset window location, size, shape, or any combination thereof for the second slide,
a second live video feed location, size, shape, or any combination thereof for the second slide, or both.

5. The tangible, non-transitory, computer-readable medium of claim 2, comprising computer-readable instructions that, when executed by the one or more processors of the computer, cause the computer to:
determine, based upon one or more characteristics of a first slide:
a first inset window location, size, shape, or any combination thereof for the first slide,
a first live video feed location, size, shape, or any combination thereof for the first slide, or both; and
determine, based upon one or more characteristics of a second slide:
a second inset window location, size, shape, or any combination thereof for the second slide that is different than the first inset window location, size, shape, or any combination thereof,
a second live video feed location, size, shape, or any combination thereof for the second slide that is different than the first live video feed location, size, shape, or any combination thereof, or both.

6. The tangible, non-transitory, computer-readable medium of claim 5, comprising computer-readable instructions that, when executed by the one or more processors of the computer, cause the computer to:
render a view of the first slide with the inset window having the first inset window location, size, shape, or any combination thereof, with the live video feed having the first live video feed location, size, shape, or any combination thereof, or both; and
upon transition to the second slide, render a view of the second slide with the inset window having the second inset window location, size, shape, or any combination thereof, with the live video feed having the second live video feed location, size, shape, or any combination thereof, or both.

7. The tangible, non-transitory, computer-readable medium of claim 1, comprising computer-readable instructions that, when executed by the one or more processors of the computer, cause the computer to:
identify and provide a plurality of proposals for the inset window location, size, shape, or any combination thereof; the live video feed location, size, shape, or any combination thereof; or both;
receive a selection of one of the plurality of proposals; and
set the inset window location, size, shape, or any combination thereof; the live video feed location, size, shape, or any combination thereof; or both in accordance with the selection.

8. The tangible, non-transitory, computer-readable medium of claim 1, comprising computer-readable instructions that, when executed by the one or more processors of the computer, cause the computer to:
identify one or more objects of the one or more slides; and
define the inset window location, size, shape, or any combination thereof; the live video feed location, size, shape, or any combination thereof; or both, based at least in part upon the one or more objects.

9. The tangible, non-transitory, computer-readable medium of claim 1, wherein the live video feed comprises a view of a presenter of the presentation.

10. The tangible, non-transitory, computer-readable medium of claim 1, comprising computer-readable instructions that, when executed by the one or more processors of the computer, cause the computer to:
capture a recording of the presentation; and
cause the inset window, the live video feed, or both to render in accordance with timings of the recording.

11. The tangible, non-transitory, computer-readable medium of claim 1, comprising computer-readable instructions that, when executed by the one or more processors of the computer, cause the computer to:
receive an edit to the inset window location, size, shape, or any combination thereof; the live video feed location, size, shape, or any combination thereof; or both, while in an edit mode of the slide presentation application; and
in response to receiving the edit, adjust the inset window location, size, shape, or any combination thereof; the live video feed location, size, shape, or any combination thereof; or both.

12. The tangible, non-transitory, computer-readable medium of claim 1, comprising computer-readable instructions that, when executed by the one or more processors of the computer, cause the computer to:
receive a request, via the GUI, to provide the inset window, the live video feed, or both across all slides of the presentation; and
in response to the request to provide the inset window, the live video feed, or both across all slides of the presentation, automatically insert the inset window, the live video feed, or both across all slides of the presentation.

13. The tangible, non-transitory, computer-readable medium of claim 1, comprising computer-readable instructions that, when executed by the one or more processors of the computer, cause the computer to:
identify one or more formatting features that are cohesive with a design of the one or more slides; and
alter formatting of the inset window in accordance with the formatting features to cause the inset window to be cohesive with the design of the one or more slides.

14. A computer-implemented method, comprising:
rendering, in a graphical user interface (GUI) of a slide presentation application, an affordance to provide a live video feed in one or more slides of a presentation to be presented by the slide presentation application;
receiving an indication of selection of the affordance;
in response to receiving the indication of the selection of the affordance, inserting an inset window into the one or more slides of the presentation, the inset window having an inset window location, size, shape, or any combination thereof that provides an indication of a live video feed location, size, shape, or any combination thereof that will be provided in the one or more slides;
receiving, via the GUI, an indication to present the presentation;
capturing the live video feed from one or more input devices communicatively coupled to the computer; and
in response to receiving the indication to present the presentation, presenting the presentation with the live video feed.

15. The computer-implemented method of claim 14, comprising:
- identifying one or more characteristics of the one or more slides of the presentation;
- determining, based upon the one or more characteristics of the one or more slides of the presentation:
  - the inset window location, size, shape, or any combination thereof,
  - the live video feed location, size, shape, or any combination thereof, or
  - both.

16. The computer-implemented method of claim 15, wherein the one or more characteristics of the one or more slides comprises one or more templates associated with the one or more slides.

17. The computer-implemented method of claim 14, comprising:
- determining, based upon one or more characteristics of a first slide:
  - a first inset window location, size, shape, or any combination thereof for the first slide,
  - a first live video feed location, size, shape, or any combination thereof for the first slide, or
  - both;
- determining, based upon one or more characteristics of a second slide:
  - a second inset window location, size, shape, or any combination thereof for the second slide that is different than the first inset window location, size, shape, or any combination thereof,
  - a second live video feed location, size, shape, or any combination thereof for the second slide that is different than the first live video feed location, size, shape, or any combination thereof,
- rendering a view of the first slide with the inset window having the first inset window location, size, shape, or any combination thereof, with the live video feed having the first live video feed location, size, shape, or any combination thereof, or both; and
- upon transition to the second slide, rendering a view of the second slide with the inset window having the second inset window location, size, shape, or any combination thereof, with the live video feed having the second live video feed location, size, shape, or any combination thereof, or both.

18. The computer-implemented method of claim 14, comprising:
- identifying and providing a plurality of proposals for the inset window location, size, shape, or any combination thereof; the live video feed location, size, shape, or any combination thereof; or both;
- receiving a selection of one of the plurality of proposals; and
- setting the inset window location, size, shape, or any combination thereof; the live video feed location, size, shape, or any combination thereof; or both in accordance with the selection.

19. The computer-implemented method of claim 14, comprising:
- capturing a recording of the presentation; and
- causing the inset window, the live video feed, or both to render in accordance with timings of the recording.

20. The computer-implemented method of claim 14, comprising:
- receiving a request, via the GUI, to provide the inset window, the live video feed, or both across all slides of the presentation; and
- in response to receiving the request to provide the inset window, the live video feed, or both across all slides of the presentation, automatically inserting the inset window, the live video feed, or both across all slides of the presentation.

* * * * *